US011265829B2

(12) United States Patent
Chou et al.

(10) Patent No.: US 11,265,829 B2
(45) Date of Patent: Mar. 1, 2022

(54) METHOD AND APPARATUS FOR DETERMINING BEAM DIRECTION

(71) Applicant: FG INNOVATION COMPANY LIMITED, Tuen Mun (HK)

(72) Inventors: Chie-Ming Chou, Zhubei (TW); Yu-Hsin Cheng, Hsinch (TW)

(73) Assignee: FG INNOVATION COMPANY LIMITED, Tuen Mun (HK)

( * ) Notice: Subject to any disclaimer, the term of this patent is extended or adjusted under 35 U.S.C. 154(b) by 0 days.

(21) Appl. No.: 15/863,033

(22) Filed: Jan. 5, 2018

(65) Prior Publication Data

US 2018/0192384 A1 Jul. 5, 2018

Related U.S. Application Data

(60) Provisional application No. 62/442,807, filed on Jan. 5, 2017.

(51) Int. Cl.
*H04W 56/00* (2009.01)
*H04W 74/08* (2009.01)
(Continued)

(52) U.S. Cl.
CPC ......... *H04W 56/001* (2013.01); *H04W 24/10* (2013.01); *H04W 72/044* (2013.01);
(Continued)

(58) Field of Classification Search
None
See application file for complete search history.

(56) References Cited

U.S. PATENT DOCUMENTS

2015/0078369 A1* 3/2015 Khude ............. H04W 56/0015
370/350
2015/0092655 A1* 4/2015 Liao ..................... H04J 11/0079
370/312

(Continued)

FOREIGN PATENT DOCUMENTS

CN 104184504 A 12/2014
CN 104205674 A 12/2014
(Continued)

OTHER PUBLICATIONS

ZTE, ZTE Microelectronics:"Considerations on SS burst design", 3GPP Draft; R1-1611269, 3rd Generation Partnership Project (3GPP), Mobile Competence Centre; 650, Route Des Lucioles ; F-06921 Sophia-Antipolis Cedex; France, vol. RAN WG1, no. Reno, USA; Nov. 14,-2016-Nov. 18, 2016, Nov. 13, 2016 (Nov. 13, 2016), Section 3.

(Continued)

*Primary Examiner* — Ajit Patel
*Assistant Examiner* — Liem H. Nguyen
(74) *Attorney, Agent, or Firm* — Finnegan, Henderson, Farabow, Garrett & Dunner LLP

(57) ABSTRACT

A method for a user equipment (UE) to synchronize with a first transmit-receive point (TRP) is disclosed. The method includes receiving, by the UE, beam information of the first TRP from a second TRP; detecting, by the UE, a synchronization signal in a beam from the first TRP based on the beam information; transmitting, by the UE, a physical random access channel (PRACH) preamble to the first TRP to synchronize with the first TRP; where the first TRP operates in a first frequency, and the second TRP operates in a second frequency lower than the first frequency.

20 Claims, 20 Drawing Sheets

(51) Int. Cl.
    *H04W 24/10*     (2009.01)
    *H04W 72/04*     (2009.01)
    *H04W 76/27*     (2018.01)
    *H04W 16/28*     (2009.01)
    *H04W 88/02*     (2009.01)

(52) U.S. Cl.
    CPC ....... *H04W 74/0833* (2013.01); *H04W 76/27* (2018.02); *H04W 16/28* (2013.01); *H04W 88/02* (2013.01)

(56) References Cited

U.S. PATENT DOCUMENTS

| | | | | |
|---|---|---|---|---|
| 2015/0358129 | A1 | 12/2015 | Ryu et al. | |
| 2017/0264406 | A1* | 9/2017 | Lei | H04L 27/2613 |
| 2017/0353257 | A1* | 12/2017 | Islam | H04J 3/0617 |
| 2018/0115990 | A1* | 4/2018 | Abedini | H04W 74/006 |
| 2018/0359790 | A1* | 12/2018 | Ingale | H04W 8/24 |
| 2019/0075547 | A1* | 3/2019 | Chae | H04W 72/02 |
| 2019/0200309 | A1* | 6/2019 | Zeng | H04W 88/023 |

FOREIGN PATENT DOCUMENTS

| | | |
|---|---|---|
| CN | 105282774 A | 1/2016 |
| CN | 105491682 A | 4/2016 |
| CN | 105493547 A | 4/2016 |
| CN | 105659665 A | 6/2016 |
| CN | 106102104 A | 11/2016 |
| WO | 2011063290 A1 | 5/2011 |
| WO | 2015191200 A1 | 12/2015 |

OTHER PUBLICATIONS

Nokia, Alcatel-Lucent Shanghai Bell:"On NR synchronization signal periodicity", 3GPP Draft R1-1612804, 3rd Generation Partnership Project (3GPP), Mobile Competence Centre; 650, Route Des Lucioles; F-06921 Sophia-Antipolis Cedex; France, vol. RAN WG1, no. Reno, U.S.A. Nov. 14, 2016-Nov. 18, 2016; Nov. 13, 2016 (Nov. 13, 2016); Section 2.2; Section 2.5; figures 1, 2.

China National Intellectual Property Administration (CNIPA), Office Action in relation to Patent Application No. CN 201880006123.2, dated Oct. 11, 2021 (9 pages).

* cited by examiner

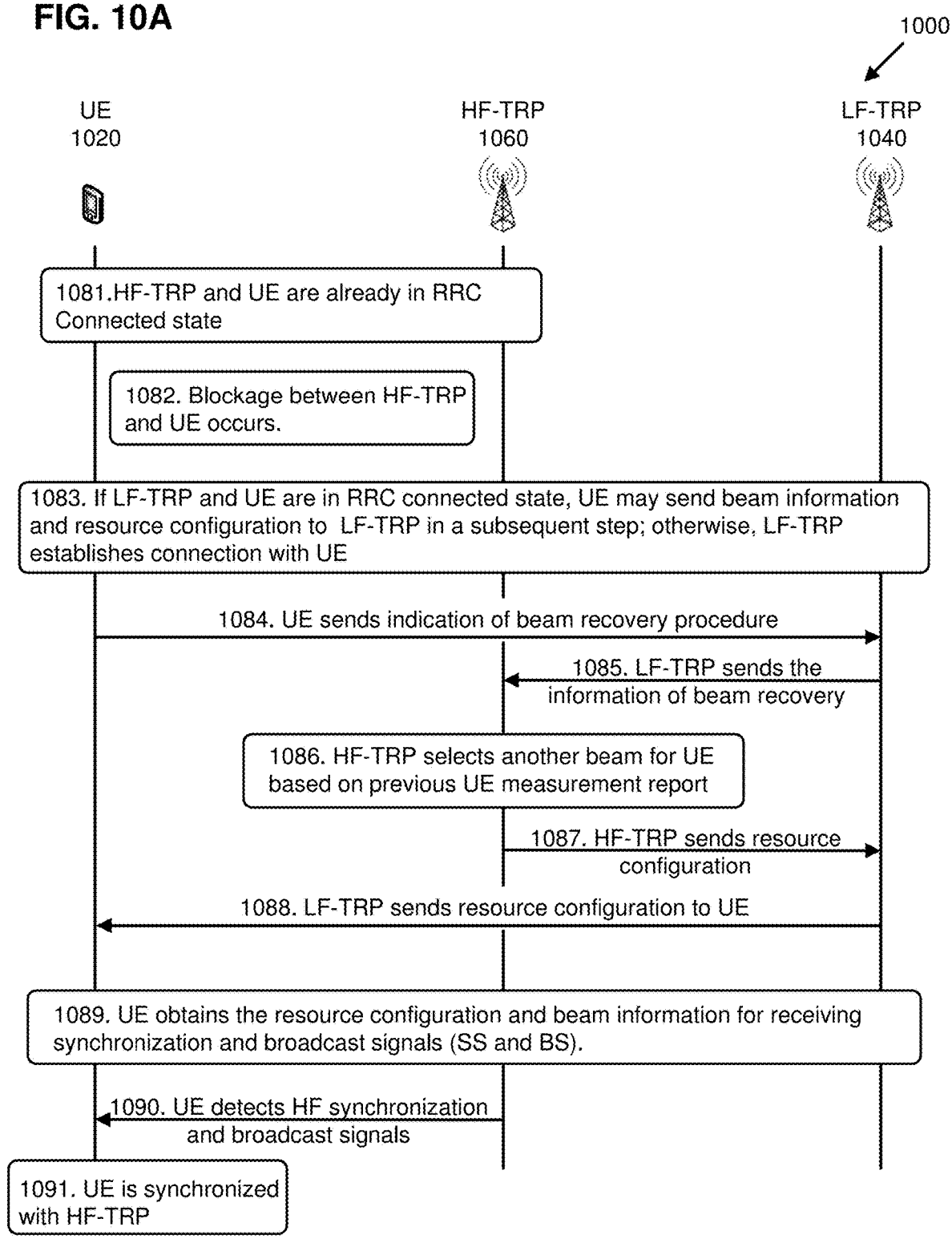

METHOD AND APPARATUS FOR DETERMINING BEAM DIRECTION

CROSS-REFERENCE TO RELATED APPLICATION(S)

The present application claims the benefit of and priority to a provisional U.S. Patent Application Ser. No. 62/442,807 filed Jan. 5, 2017, entitled "METHOD AND APPARATUS FOR DETERMINING BEAM DIRECTION," (hereinafter referred to as "US61764 application"). The disclosure of the US61764 application is hereby incorporated fully by reference into the present application.

TECHNICAL FIELD

The present disclosure generally relates to determining beam directions, and more particularly, to low frequency transmission reception point (LF-TRP) assisted beam sweeping methods for beam alignment between a user equipment (UE) and a high frequency transmission reception point (HF-TRP) for initial access and beam recovery procedures in a wireless communication network.

BACKGROUND

The $3^{rd}$ Generation Partnership Project (3GPP) is developing the architecture and protocols for the next generation (e.g., $5^{th}$ Generation (5G)) wireless communication networks (e.g., new radio (NR)). An NR network strives to deliver sub-millisecond latency and at least 1 Gbps (e.g., 10 Gbps) downlink speed, and support billions of connections. In comparison, a $4^{th}$ Generation (4G) wireless network, such as a legacy long-term-evolution (LTE) network, can support at most 150 Mbps downlink speed with a single carrier. Thus, an NR network may have a system capacity that is 1000 times of the capacity of the current 4G wireless network. To meet these technical requirements, the NR exploits higher frequencies of the radio spectrum in the millimeter wave range (e.g., 1 to 300 GHz) which can provide greater bandwidth.

Extensive studies have been focused on millimeter wave, directional antenna, and beamforming technologies, which are imperative to meet the anticipated 1000 times system capacity for the NR requirements. For example, millimeter wave components such as antenna array elements are found suitable for multiple spatial streams, beamforming and beam steering. Also, HF-TRP is introduced to support millimeter wave transmission and reception.

In general, HF-TRP can provide directional antenna with higher antenna gain, support larger bandwidth transmission, and avoid inter-band interference with the existing system. However, due to high path loss of the millimeter waves, both a user equipment (UE) and a HF-TRP need directional antennas and related beam-based transmissions to perform beam sweeping to detect and establish a connection between each other.

For example, to obtain an initial access, a UE is required to perform beam sweeping for establishing a radio link with an access point (e.g., transmit-receive point (TRP)) from a radio resource control (RRC) idle state. The TRP may transmit a plurality of synchronization signal (SS) blocks in an SS frame to the UE, where each SS block represents a beam. For a downlink (DL) transmission (TX) from the TRP to the UE, the UE needs to sweep DL reception (RX) beams in all directions, and use each DL RX beam to receive every DL TX beam from the TRP, in order to find a qualified TX and RX beam pair. This process requires the UE to receive all of the SS blocks in the SS frame from the TRP to find the qualified TX and RX beam pair. In addition, when the UE is in an RRC Connected state and a blockage or foliage occurs in the beam path between the UE and the TRP, the transmission may be interrupted with a severe degradation in signal strength such that a beam sweeping is needed by the UE and/or the TRP to find a better transmission path.

FIG. 1 is a diagram illustrated procedures for obtaining an initial access between a UE and a TRP using beam sweeping. The initial access procedure is performed to allow the UE to synchronize with the TRP and receive random access channel (RACH) resource, for example. In FIG. 1, TRP 160 may send synchronization signals (e.g., primary and secondary synchronization signals (PSS and SSS)), or physical broadcast channel (PBCH) in different beams (e.g., DL TX beams within a SS frame) with different directions and/or separate time units. UE 120 can obtain the information contained in each of the beams from TRP 160 by performing beam sweeping. As shown in FIG. 1, for each beam transmitted from TRP 160, UE 120 needs to sweep DL reception (RX) beams in all directions, and use each DL RX beam to receive every DL TX beam from TRP 160, for example, in order to obtain the RACH resource information to establish a connection with TRP 160 for data transmission. This process requires UE 120 to receive all of DL TX beams (i.e., all of the SS blocks in the SS frame) from TRP 160 to find a qualified TX and RX beam pair for beam alignment.

FIG. 2A is a diagram illustrating a normal beam-based transmission between a UE and a TRP in an RRC Connected state, according to an exemplary implementation of the present application. In FIG. 2A, UE 220 and TRP 260 establish at least one radio link for beam-based transmission. The beams of UE 220 and TRP 260 are aligned with each other. UE 220 is in the RRC Connected state.

FIG. 2B is a diagram illustrating a radio link failure when a blockage occurs in the transmission path between a UE and a TRP in an RRC Connected state, according to an exemplary implementation of the present application. In FIG. 2B, an object (e.g., a car, a person, a rain drop, or a foliage) interrupts the transmission path between UE 220 and TRP 260, which may lead to dramatic degradation in signal quality of the beam-based transmission. The degradation in signal quality may cause UE 220 to start a timer for radio link recovery. UE 220 and/or TRP 260 may start a beam recovery procedure, for example, to find other beams and beam paths by using beam sweeping, to re-establish connection with each other before the timer for radio link recovery expires. In FIG. 2B, both UE 220 and TRP 260 may attempt to identify another transmission path to prevent radio link failure.

The radio link failure handling procedures for beam recovery may be different from the initial access procedures for the beam-based transmission, because, for beam recovery, the UE may recover its connection with the TRP by using other beams. However, in both cases, conducting a full beam sweeping for detecting millimeter waves may consume a lot of resources (e.g., radio, time and power). For example, for obtaining an initial access, conventional methods require both the UE and TRP to perform beam sweeping in all directions, which consumes radio resources, time and power. The UE may spend a lot of battery power on searching for the initial access information, which may lead to shortened battery life for the UE. In addition, if the beam sweeping takes too long, the UE may move away to a different location, which may further impact the downlink performance. The beam recovery procedures are important to prevent the triggering of radio link failure in beam-based transmissions. However, if the UE and TRP cannot find other beams to prevent radio link failure, the UE may incur a lot of signaling overhead (e.g., RRC re-establishment signaling, RLF signaling, and etc.), resulting in radio resource waste.

Thus, there is a need in the art for methods to allow a UE to conduct beam sweeping of a portion (e.g., a few SS blocks, as opposed to all of the SS blocks) of a synchronization signal frame to obtain an initial access or a beam recovery with a TRP, such as a HF-TRP.

SUMMARY

The present application is directed to LF-TRP assisted beam sweeping methods for beam alignment between a UE and a HF-TRP for initial access and beam recovery procedures.

BRIEF DESCRIPTION OF THE DRAWINGS

FIG. 10A is a diagram illustrating procedures for HF-TRP beam recovery using LF-TRP assisted UE beam sweeping, according to an exemplary implementation of the present application.

DETAILED DESCRIPTION

Figure 1:
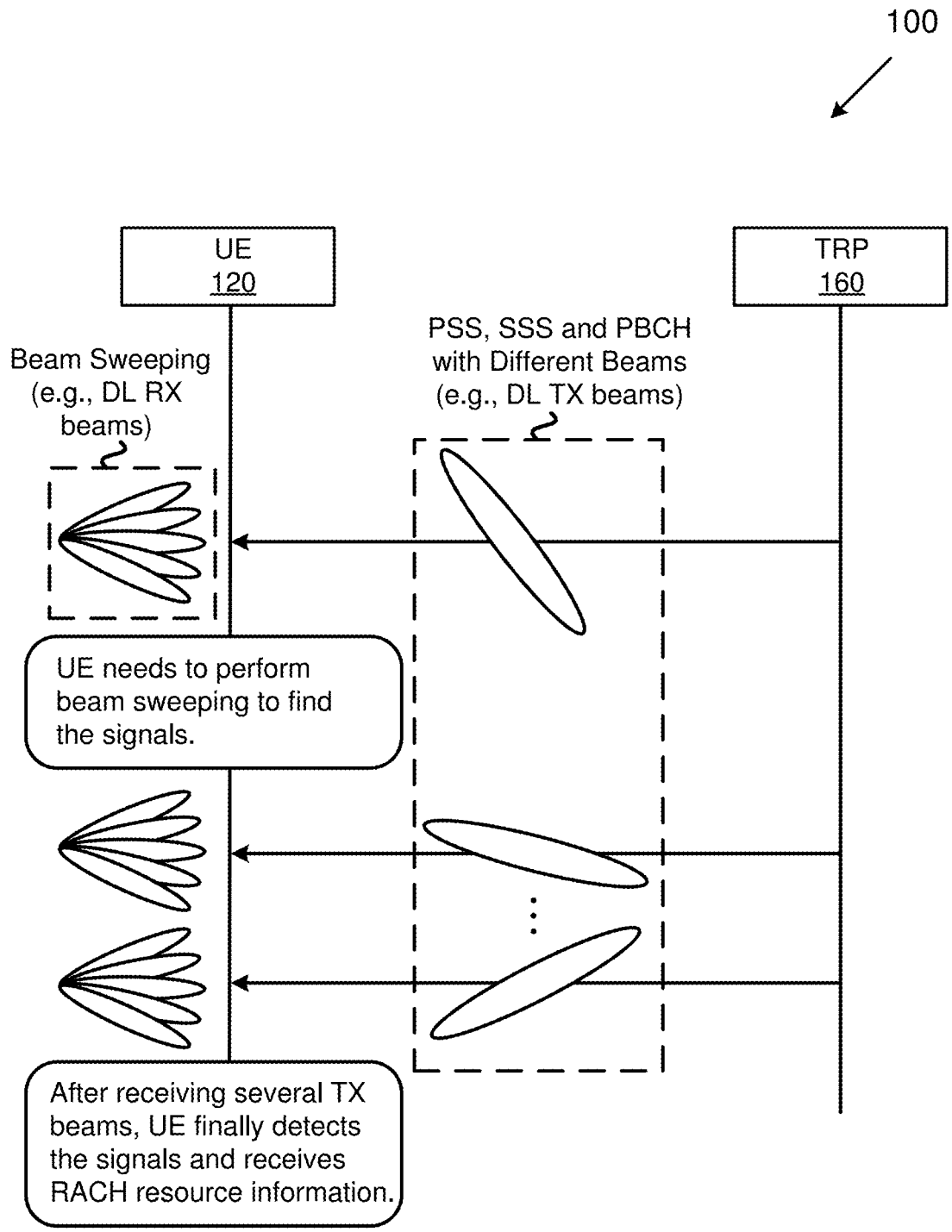
FIG. 1 is a diagram illustrating procedures for obtaining an initial access between a UE and a TRP using beam sweeping, according to an exemplary implementation of the present application.

The following description contains specific information pertaining to implementations in the present application. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

For the purpose of consistency and ease of understanding, like features are identified (although, in some examples, not shown) by numerals in the exemplary figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present application may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processor (DSPs). Although some of the exemplary implementations described in the present application are oriented to software installed and executing on computer hardware, nevertheless, alternative exemplary implementations implemented as firmware or as hardware or combination of hardware and software are well within the scope of the present application.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

The present application provides a method for signaling RAN parameters adopting a RAN profile indexing mechanism to facilitate the transmission and reception operations, where the RAN profile indices correspond to the physical layer compositions between a cell in a radio access network and at least one mobile station (e.g., a UE). By using the indexing mechanism to indicate the RAN profile information, the amount of signaling overhead and latency incurred for RAN profile may be greatly reduced, while supporting the flexibility of NR network system.

A radio communication network architecture (e.g., a long term evolution (LTE) system, a LTE-Advanced (LTE-A) system, or a LTE-Advanced Pro system) typically includes at least one base station, at least one user equipment (UE), and one or more optional network elements that provide connection towards a network. The UE communicates with the network (e.g., a core network (CN), an evolved packet core (EPC) network, an Evolved Universal Terrestrial Radio Access (E-UTRA) network, a Next-Generation Core (NGC), or an internet), through a radio access network (RAN) established by the base station.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a personal digital assistant (PDA) with wireless communication capability. The UE is configured to receive and transmit signals over an air interface to one or more cells in a radio access network.

A TRP (e.g., HF-TRP or LF-TRP), which is also be regarded as a remote radio head (RRH), may be a transceiver under the protocols of 5G NR wireless communication system and/or the protocols of a 4G wireless communication system. A TRP may be communicatively connected to a base station, which may be, but not limited to, a node B (NB) as in the LTE, an evolved node B (eNB) as in the LTE-A, a radio network controller (RNC) as in the UMTS, a base station controller (BSC) as in the GSM/GERAN, a new radio evolved node B (NR eNB) as in the NR, a next generation node B (gNB) as in the NR, and any other apparatus capable of controlling radio communication and managing radio resources within a cell. The base station may connect to serve the one or more UEs through one or more TRPs in the radio communication system.

A base station may be configured to provide communication services according to at least one of the following radio access technologies (RATs): Worldwide Interoperability for Microwave Access (WiMAX), Global System for Mobile communications (GSM, often referred to as 2G), GSM EDGE radio access Network (GERAN), General Packet Radio Service (GRPS), Universal Mobile Telecommunication System (UMTS, often referred to as 3G) based on basic wideband-code division multiple access (W-CDMA), high-speed packet access (HSPA), LTE, LTE-A, New Radio (NR, often referred to as 5G), and/or LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within its radio coverage indicated by 3GPP TS 36.300, which is hereby also incorporated by reference. More specifically, each cell (often referred to as a serving cell) provides services to serve one or more UEs within its radio coverage, (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting proximity service (ProSe). Each cell may have overlapped coverage areas with other cells.

As discussed above, the frame structure for NR is to support flexible configurations for accommodating various next generation (e.g., 5G) communication requirements, such as enhanced mobile broadband (eMBB), massive machine type communication (mMTC), ultra reliable communication and low latency communication (URLLC) more efficiently, while fulfilling high reliability, high data rate and low latency requirements. The orthogonal frequency-division multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may be also used. Additionally, three candidate coding schemes are considered for NR: (1) low-density parity-check (LDPC), (2) Polar Code, and (3) Turbo Code. The coding scheme adaption may be configured based on the channel conditions and/or the service applications.

Moreover, it is also considered that in a transmission time interval $T_X$ of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR.

Millimeter waves suffer from high path loss because the free space path loss is proportional to the square of the carrier frequency. Thus, HF-TRPs need to employ directional antennas for beamforming gain to compensate for the high path loss of the millimeter waves. However, the beamforming gain is inversely proportional to the beam-width. That is, a UE and a HF-TRP need to perform beam alignment to detect each other. Exemplary implementations of the present application employ low frequency transmission to compensate the millimeter wave path loss, reduce the required time duration for synchronization, and improve the system robustness in the NR stand-alone case. The beam widths of LF-TRPs are wider than the beam widths of the HF-TRPs. Thus, the LF-TRPs can increase beam sweeping efficiency while reducing high path loss.

Figure 3:
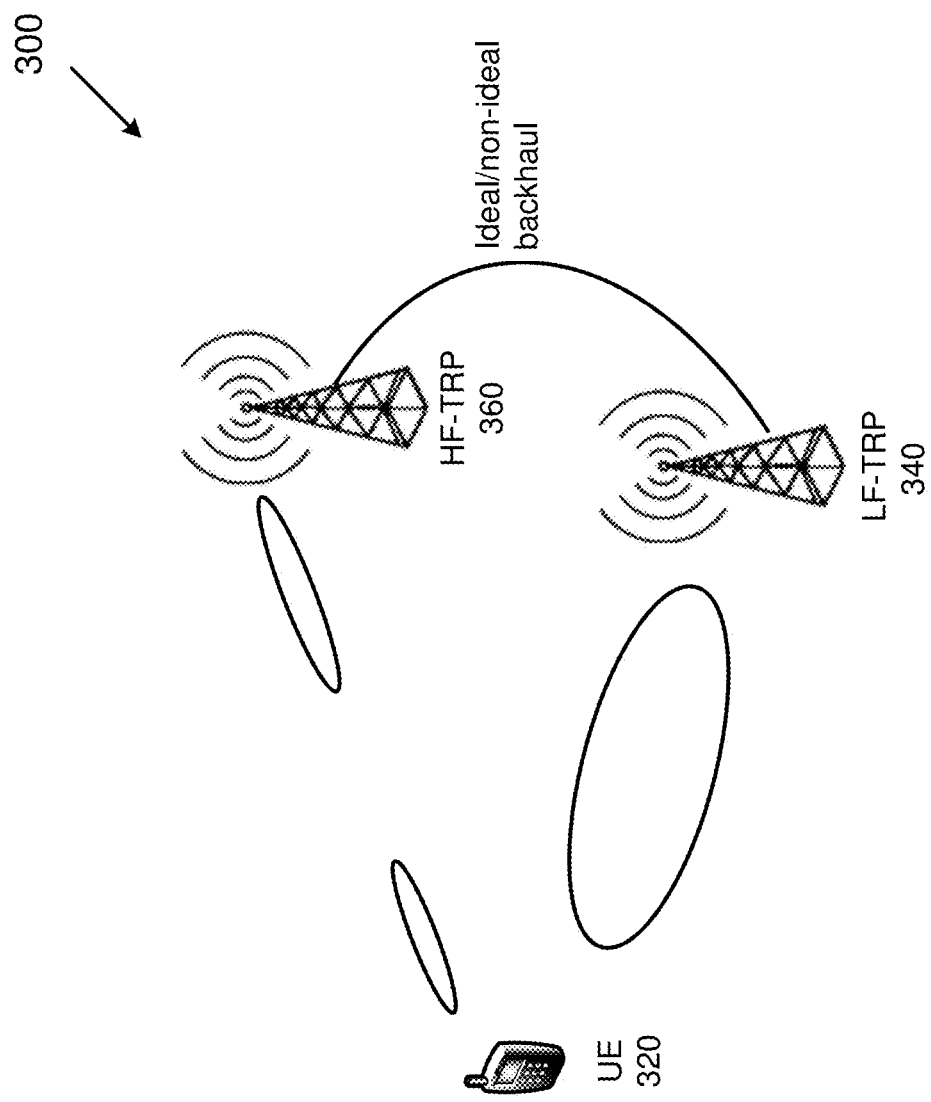
FIG. 3 is a diagram illustrating a low frequency assisted network, according to an exemplary implementation of the present application.

FIG. 3 is a diagram illustrating a low frequency assisted network, according to an exemplary implementation of the present application. In FIG. 3, low frequency assisted network 300 includes UE 320, LF-TRP 340, and HF-TRP 360. UE 320 and HF-TRP 360 may use high frequency beams (e.g., 3.5 GHz or greater) to communicate with each other. UE 320 and LF-TRP 340 may use low frequency beams (e.g., 2.7 GHz or less) to communicate with each other. As shown in FIG. 3, the beam width used by LF-TRP 340 is substantially wider than the beam width used by HF-TRP 360. In addition, HF-TRP 360 and LF-TRP 340 may employ ideal or non-ideal backhaul to communicate with each other.

Figure 4:
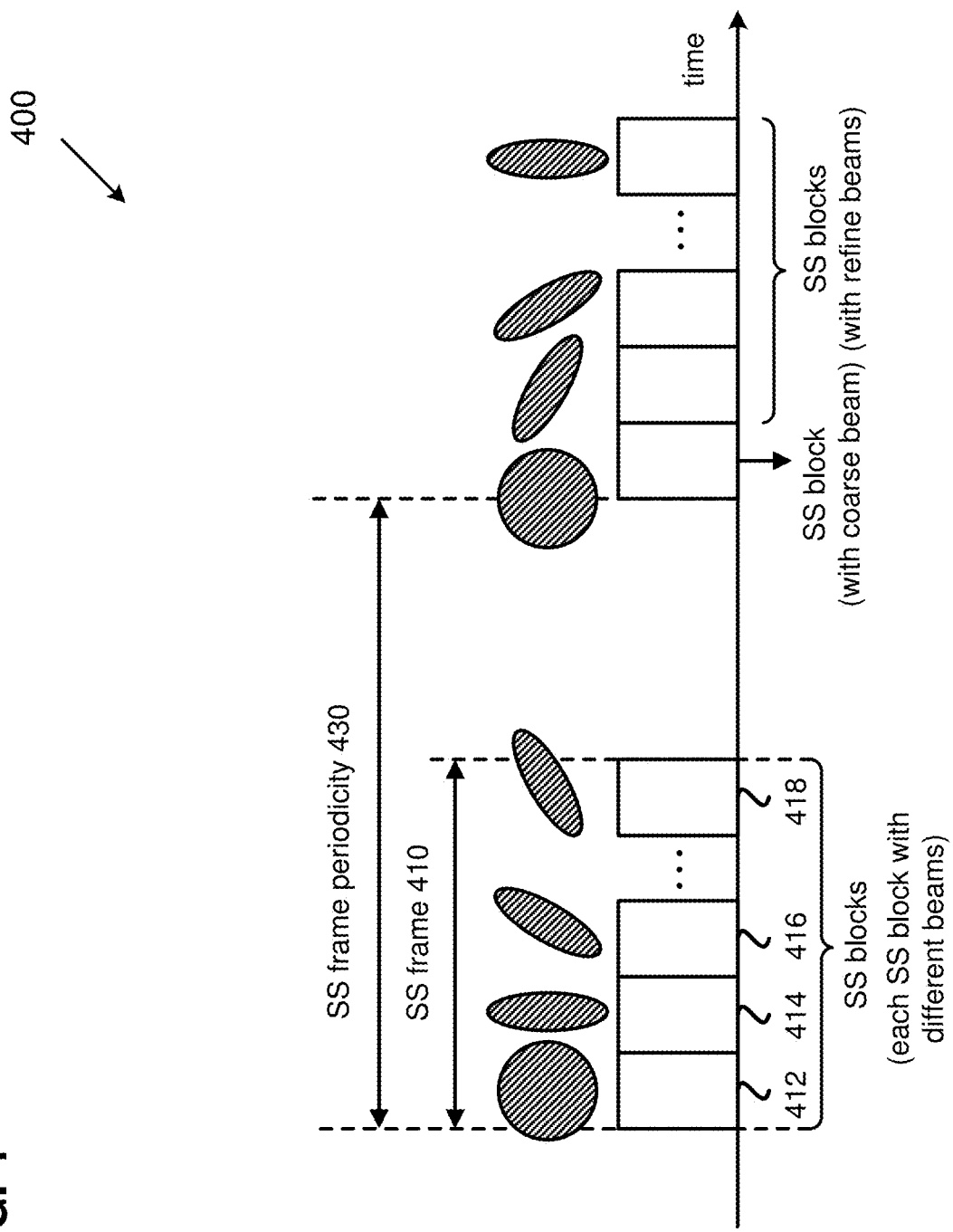
FIG. 4 is a diagram illustrating the structures of synchronization signal blocks and synchronization signal frames, according to an exemplary implementation of the present application.

FIG. 4 is a diagram illustrating the structures of synchronization signal blocks and synchronization signal frames from a HF-TRP, according to an exemplary implementation of the present application. As shown in FIG. 4, in diagram 400, synchronization signal (SS) frame 410 includes SS blocks 412, 414, 416, and 418, each corresponding to a different beam. It should be noted that SS frame 410 can be also referred to as a synchronization signal burst. The SS frame 410 may have periodicity 430. In the case for obtaining an initial access between a UE and a HF-TRP using beam-based transmission, the UE needs to use different transmission (TX) and reception (RX) beams to detect the synchronization signals (e.g., contained in SS blocks of a SS frame) from the HF-TRP. That is, the UE needs to perform beam sweeping first.

According to the present exemplary implementation, synchronization signal blocks and synchronization signal frame for beam-based initial access are preceded by or followed by various beamforming matrices. Also, the HF-TRP sends synchronization signals periodically in a pre-determined SS frame periodicity 430. Since each synchronization signal block is preceded by or followed by various beamforming matrices, the UE can perform beam sweeping through each of the synchronization signal blocks and synchronization signal frames.

In the present exemplary implementation, the UE conducts beam sweeping of a portion (e.g., a few SS blocks, as opposed to all of the SS blocks) of the synchronization signal frame to determine the beam direction to synchronize with the HF-TRP. By contrast, in conventional methods, a UE has to receive all of the synchronization signal blocks in a synchronization signal frame from a HF-TRP to perform a beam sweep (i.e., beam sweeping in all directions) for each SS block. For example, the UE has to sweep DL RX beams in all directions, and use each DL RX beam to receive every DL TX beam from the TRP, in order to find a qualified TX and RX beam pair for beam alignment, to achieve beam alignment with the HF-TRP.

In one exemplary implementation, a LF-TRP may notify the UE of the specific resource of the HF-TRP, such as system frame number (SFN) or synchronization signal frame periodicity and synchronization signal block timing offset. The LF-TRP may obtain the beam information based on measurement reports sent from the UE. The measurement reports from the UE may be obtained by taking measurements of the HF-TRP. The measurement reports may include UE's information such as a channel state information (CSI) report and/or a radio resource management (RRM) measurement report of the HF-TRP. The CSI report may include at least one of channel quality information (CQI), precoding matrix index (PMI), CRI (CSI-RS resource indicator), and rank indicator (RI). The RRM measurement report may include at least one or more indices of reference signals, where the reference signals include a synchronization signal block (SSB) and a channel state information reference signal (CSI-RS).

Figure 5A:
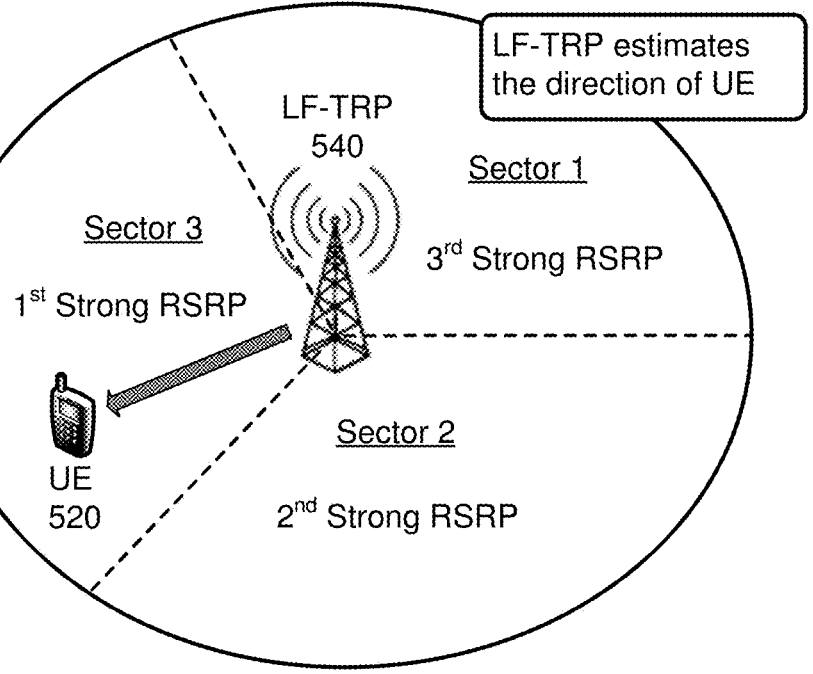
FIGS. 5A and 5B are diagrams illustrating exemplary mechanisms for obtaining UE beam information in low frequency, according to exemplary implementations of the present application.
Figure 5B:
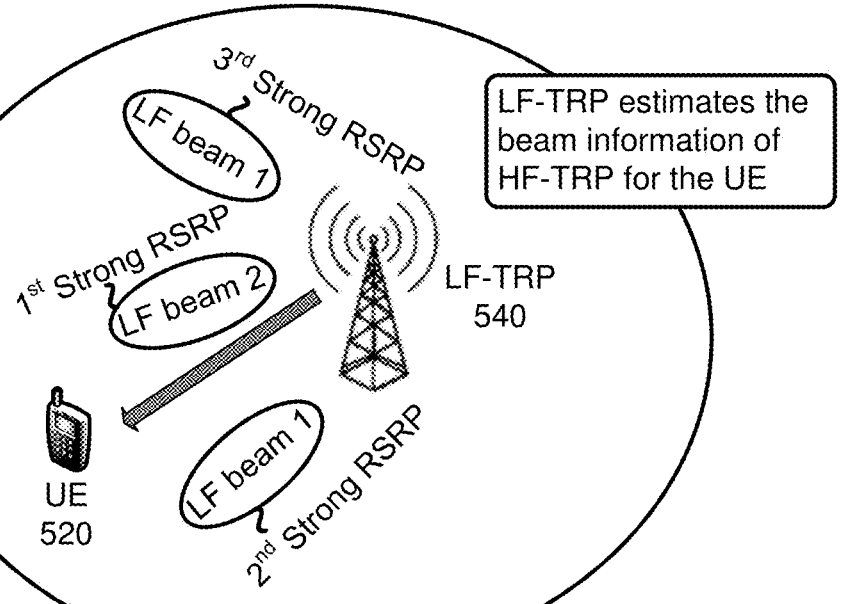

FIGS. 5A and 5B are diagrams illustrating mechanisms for obtaining UE beam information in low frequency, according to exemplary implementations of the present application. In FIG. 5A, in one exemplary implementation for obtaining UE beam information in low frequency, LF-TRP 540 may measure the reference signal received power (RSRP) of UE 520 from three different sectors, and combine the measurement results to obtain a rough beam information (e.g., beam direction) of UE 520. In FIG. 5A, LF-TRP 540 may obtain or estimate the relative direction of UE 520, and then transfer the information to a corresponding HF-TRP (e.g., HF-TRP 360 in FIG. 3). After receiving the information, the HF-TRP may derive the relative direction between the HF-TRP and UE 520 based upon the location information of LF-TRP 540 and the HF-TRP.

As shown in FIG. 5B, in another exemplary implementation for obtaining UE beam information in low frequency, LF-TRP 540 may use a channel state information (CSI) report (e.g., including channel quality information (CQI), precoding matrix index (PMI), rank indicator (RI) and etc.) in low frequency to obtain a rough beam direction of UE 520. The beam information contains directional information or beam precoding matrix index. For example, in FIG. 5B, LF-TRP 540 may obtain the beam information (e.g., PMI, or one or more indices of reference signals) in low frequency, and then transfer the beam information to a corresponding HF-TRP (e.g., HF-TRP 360 in FIG. 3). The HF-TRP may derive the corresponding beam information (e.g., PMI, or one or more indices of reference signals) in high frequency based upon the beam information (e.g., PMI, or one or more indices of reference signals) in low frequency. After recognizing the beam information in high frequency, the HF-TRP may then know the corresponding synchronization signal resource of the beam information.

Figure 6A:
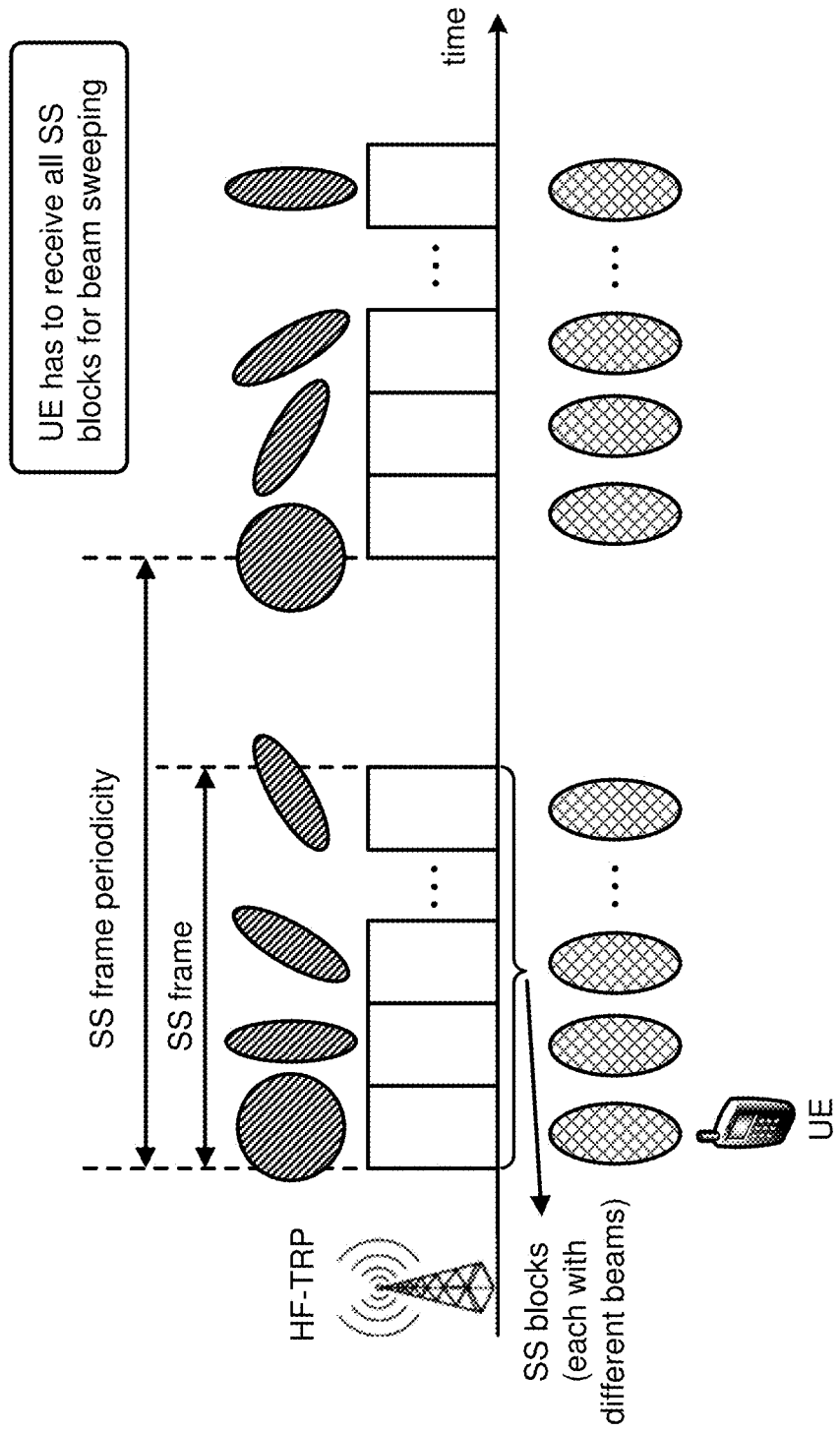
FIG. 6A is a diagram illustrating a beam sweeping method for beam alignment between a UE and a HF-TRP.

FIG. 6A is a diagram illustrating a beam sweeping method for beam alignment between a UE and a HF-TRP. In FIG. 6A, a HF-TRP sends synchronization signals periodically in synchronization signal frames. In order to detect the synchronization signals from the HF-TRP, a UE has to receive all of the synchronization signal blocks in the synchronization signal frames before performing beam sweeping. The beam sweeping method is inefficient as it consumes too much resources, such as radio resources, time and power.

Figure 6B:
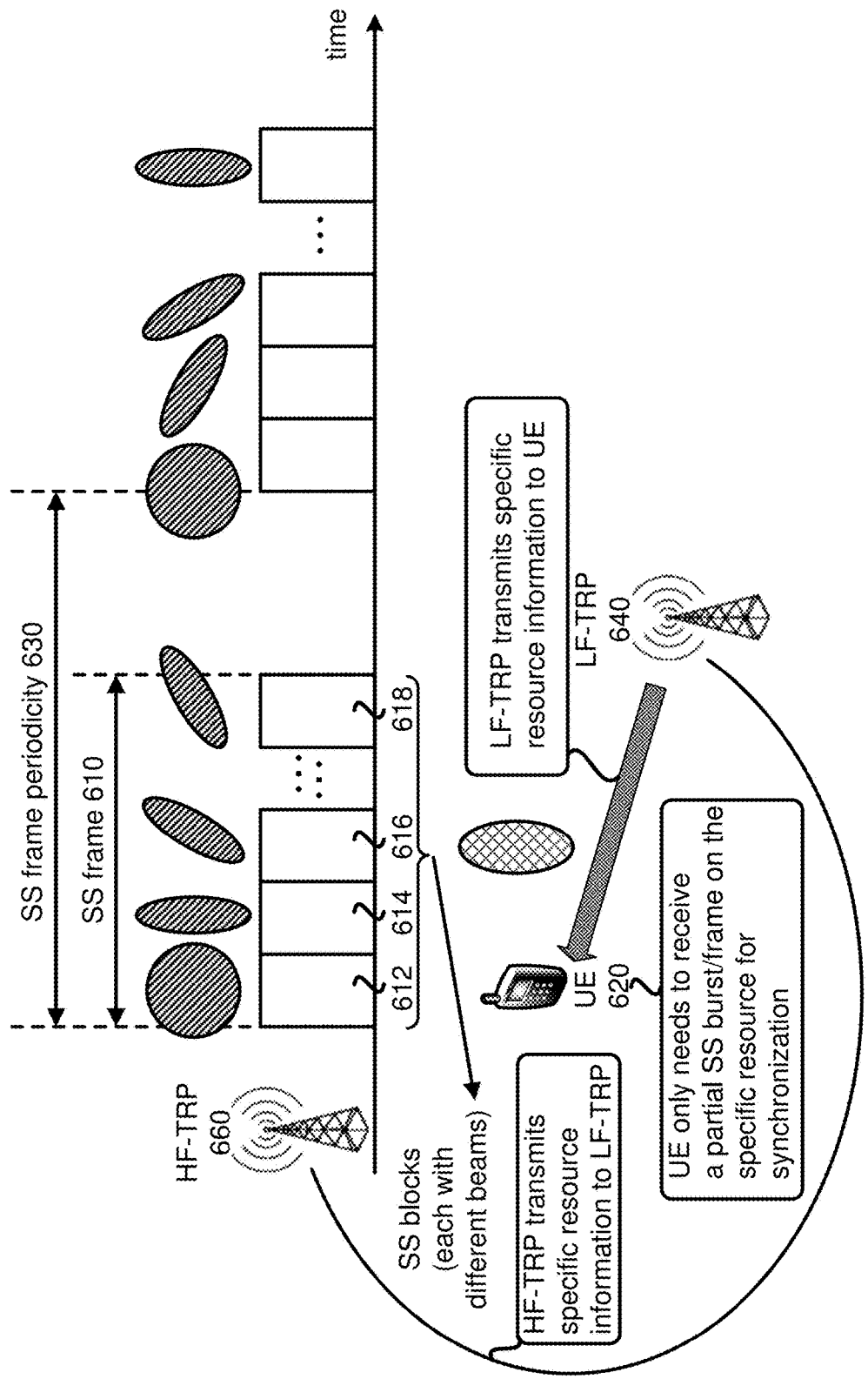
FIG. 6B is a diagram illustrating a LF-TRP assisted beam sweeping method for beam alignment between a UE and a HF-TRP, according to an exemplary implementation of the present application.

FIG. 6B is a diagram illustrating a LF-TRP assisted beam sweeping method for beam alignment between a UE and a HF-TRP, according to an exemplary implementation of the present application. In the present exemplary implementation, the UE only needs to receive a portion (e.g., a few SS blocks, as opposed to all of the SS blocks) of a synchronization signal (SS) frame. For example, the UE may only receive a single synchronization signal block to detect the synchronization signal resource from the HF-TRP to achieve beam alignment. In another example, the UE may receive a few SS blocks (e.g., 3 or 4 SS blocks), and perform beam sweeping of the few SS blocks to detect the synchronization signal resource from the HF-TRP to achieve beam alignment. In one exemplary implementation, the synchronization signal resource may include a specific frequency band and a specific time slot. The synchronization signals may be periodically transmitted in the specific frequency band.

As shown in FIG. 6B, HF-TRP 660 may transmit specific resource information to LF-TRP 640 (e.g., through ideal/non-ideal backhaul). After receiving the specific resource information, LF-TRP 640 may transmit the specific resource information to UE 620. With the specific resource indication from LF-TRP 640, UE 620 can perform beam sweeping of one or more particular SS blocks (e.g., SS block 616) to detect the synchronization signal, thereby substantially reducing beam sweeping time and power as illustrated in FIG. 6B.

Furthermore, HF-TRP 660 may assign different beams to different synchronization signal blocks for UE 620 according to channel quality of UE 620. For example, as illustrated in FIG. 4, a coarse beam and multiple refine beams are assigned to different synchronization signal blocks within the same synchronization signal frame. It is noted that, the coarse beam can cover transmit direction of all refine beams, while the beamforming gain is less than the refine beams. HF-TRP 660 may assign high mobility UEs with coarse beam synchronization signal blocks, and assign relatively stationary UEs with refine beam synchronization signal blocks.

LF-TRP 640 transmits specific resource information to UE 620 to allow UE 620 to receive only a portion (e.g., a few SS blocks, as opposed to all of the SS blocks) of the synchronization signal frame on the specific resource to perform beam sweeping. Thus, exemplary implementations of the present application can reduce time and power consumption, as well as improve the system robustness of an NR network. Also, as LF-TRP 640 may transfer information of UE 620 to HF-TRP 660, the communication between HF-TRP 660 and UE 620 can be very robust.

Case 1

HF-TRP Initial Access Using LF-TRP Assisted UE Beam Sweeping

Figure 7A:
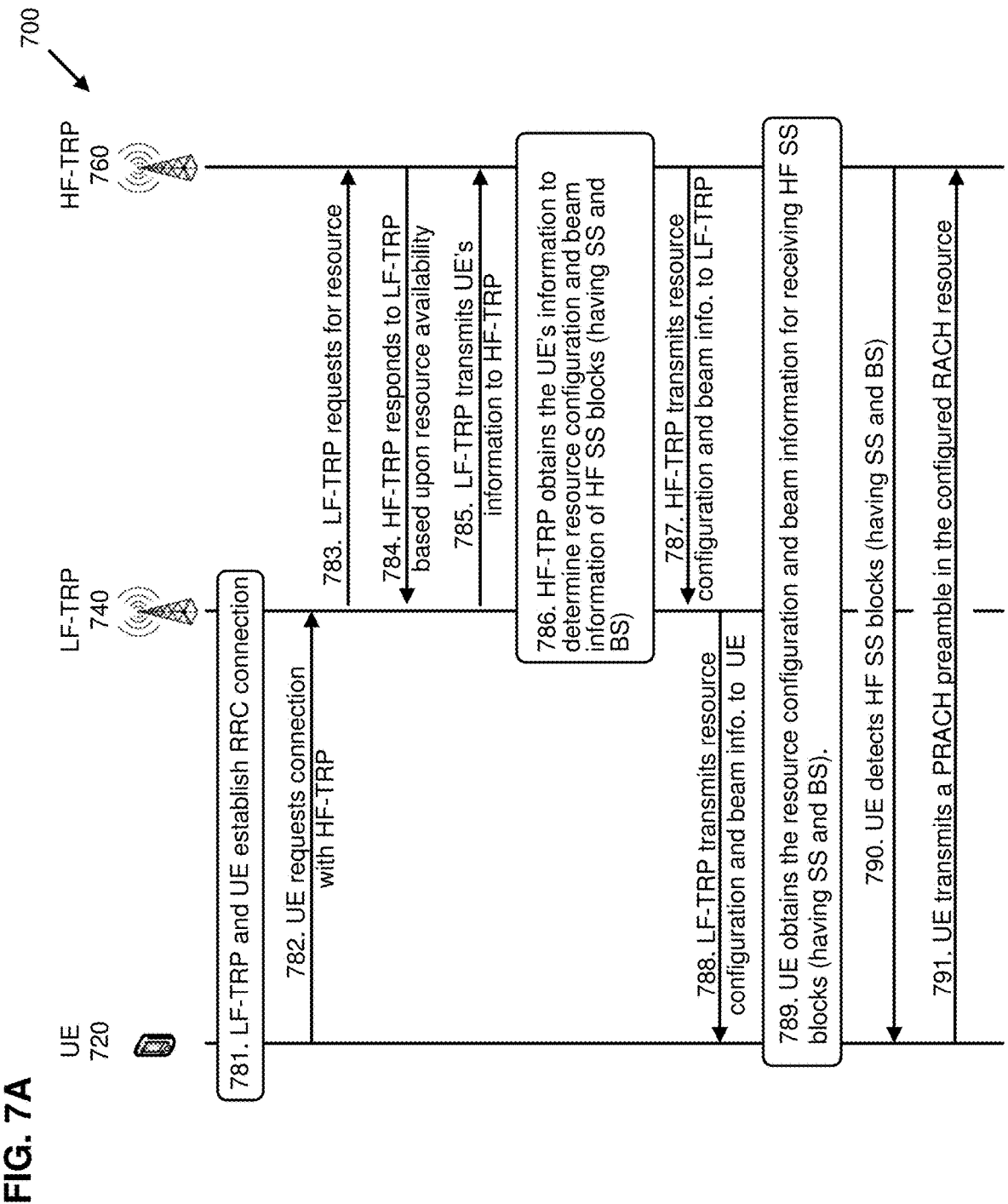
FIG. 7A is a diagram illustrating procedures for HF-TRP initial access using LF-TRP assisted UE beam sweeping, according to an exemplary implementation of the present application.

FIG. 7A is a diagram illustrating procedures for HF-TRP initial access using LF-TRP assisted UE beam sweeping, according to an exemplary implementation of the present application. In diagram 700, an NR network includes UE 720, LF-TRP 740, and HF-TRP 760. Since the NR network has both LF-TRP 740 and HF-TRP 760, UE 720 may obtain an initial access with HF-TRP 760 with the assistance of LF-TRP 740.

According implementations of the present application, a LF-TRP may be regarded as a transceiver which transmits and receives in a relatively low frequency, while a HF-TRP may be regarded as a transceiver which transmits and receives in a relatively high frequency. In one implementation, a HF-TRP may be a transceiver under the protocols of 5G NR wireless communication system (e.g., 3.5 GHz or higher frequency bands), while a LF-TRP may be a transceiver under the protocols of a 4G wireless communication system, such as LTE protocols (e.g., 2.7 GHz or lower frequency bands). In another implementation, both of the HF-TRP and LF-TRP may be transceivers under the protocols of a 5G NR wireless communication system, where the HF-TRP transmits and/or receives using a first bandwidth part (or component carrier), and LF-TRP transmits and/or receives using a second bandwidth part (or component carrier), and where a frequency the first bandwidth part is higher than a frequency of the second bandwidth part.

In action 781, UE 720 and LF-TRP 740 establish an RRC connection, (e.g., UE 720 transitioning to an RRC Connected state) in the NR network. In action 782, UE 720 sends a request to LF-TRP 740 for establishing a connection with HF-TRP 760. In action 783, LF-TRP 740 requests HF-TRP 760 to provide resource for UE 720. In action 784, HF-TRP 760 evaluates, for example, the load state of the high frequency network to determine whether there are enough radio resources for serving UE 720. Based upon the resource availability, HF-TRP 760 may respond to LF-TRP 740 with either a reject signal (e.g., there is no resource available) or a signal of allowance (e.g., if there are resources available). If LF-TRP 740 receives the signal of allowance from HF-TRP 760, LF-TRP 740 then transmits UE 720's information to HF-TRP 760 in action 785. Otherwise, LF-TRP 740 sends the reject signal to UE 720 to notify UE 720 to perform normal beam sweeping to obtain the synchronization signals from HF-TRP 760.

In action 785, LF-TRP 740 transmits UE 720's beam information (e.g., PMI, RI, CQI, large-scale parameters, and etc.) to HF-TRP 760, so that HF-TRP 760 can determine the timing information of the corresponding synchronization signals (e.g., DL TX beam). In action 786, HF-TRP 760 obtains UE 720's information to determine resource configuration (e.g., timing and frequency information) and/or beam information (e.g., DL RX beam information) of the high frequency SS blocks having synchronization signal(s) and broadcast signal(s). In action 787, HF-TRP 760 transmits the resource configuration (e.g., timing and frequency information) and/or beam information (e.g., DL RX beam information) of the high frequency SS blocks having synchronization signal(s) and broadcast signal(s) to LF-TRP 740. The timing information may include, for example, a timing offset and periodicity of the corresponding beam for notifying UE 720 when to detect the synchronization and broadcast signals from HF-TRP 760. For example, HF-TRP 760 may send a system frame number (SFN) in which UE 720 may detect synchronization and broadcast signals. HF-TRP 760 may also send the synchronization signal frame periodicity and synchronization signal block timing offset to LF-TRP 740. In action 788, LF-TRP 740 transmits the resource configuration (e.g., timing and frequency information) and/or beam information (e.g., DL RX beam information) of the high frequency SS blocks having synchronization signal(s) and broadcast signal(s) to UE 720. It should be noted that, in the present implementation, beam information for inter/intra frequency measurement may be contained in measurement configuration of RRC signaling. In action 789, UE 720 receives the resource configuration (e.g., timing and frequency information) and/or beam information (e.g., DL RX beam information) of the high frequency SS blocks having synchronization signal(s) and broadcast signal(s). In action 790, UE 720 detects the high frequency SS blocks having synchronization signal(s) and broadcast signal(s) in the specific resource and beam without a need to receive all of the synchronization signal blocks for beam sweeping. In action 791, UE 720 knows the RACH resource configuration, and sends a beam-based RACH preamble (e.g., physical RACH (PRACH) preamble) in the configured RACH resource.

Figure 7B:
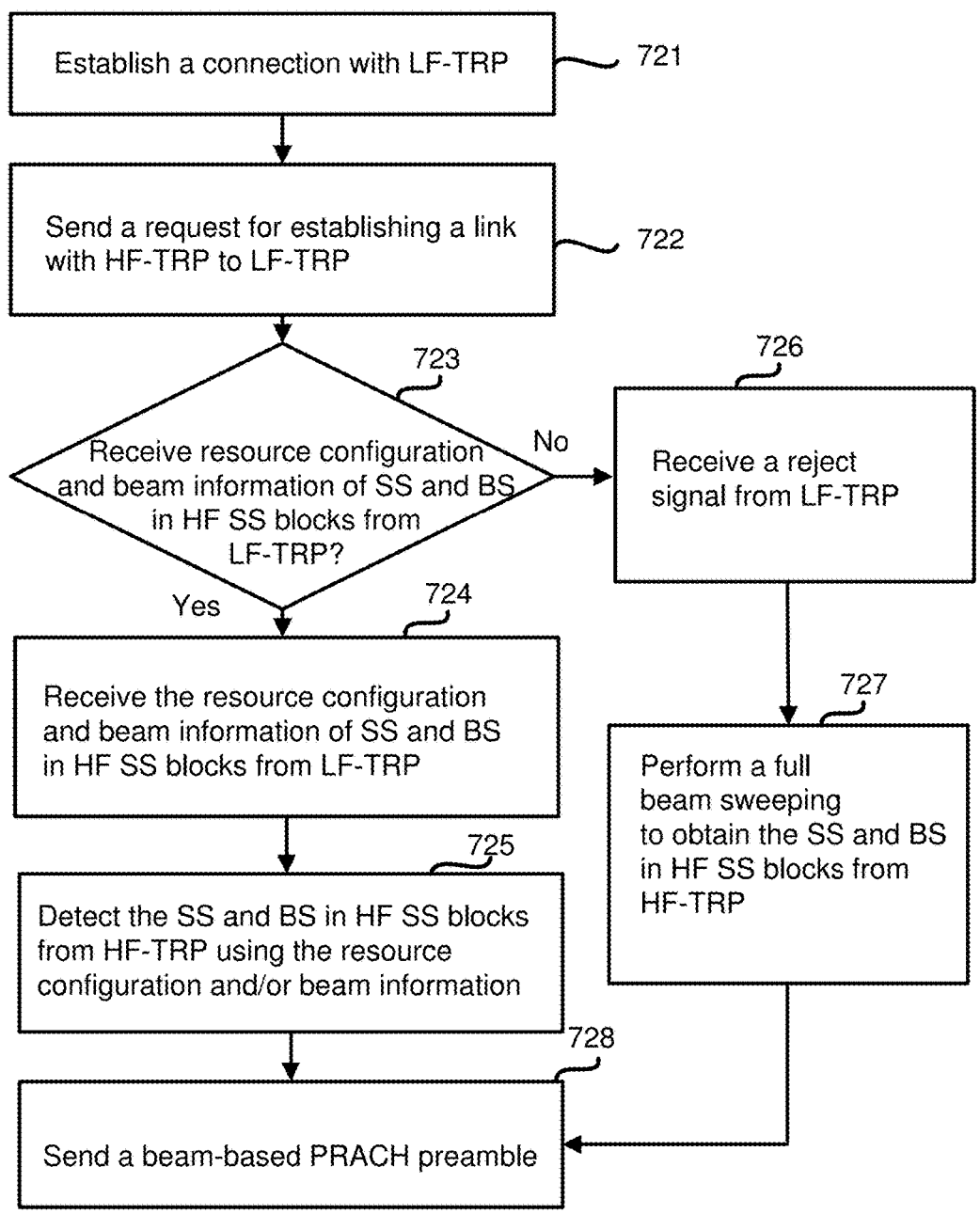
FIG. 7B is a block diagram illustrating actions taken by a UE to establish an initial access with a HF-TRP through a LF-TRP, according to an exemplary implementation of the present application.

FIG. 7B is a block diagram illustrating actions taken by a UE to establish an initial access with a HF-TRP through a LF-TRP, according to an exemplary implementation of the present application. In block 721, UE 720 establishes a connection with LF-TRP 740. In block 722, UE 720 then sends a request to LF-TRP 740 for establishing a connection with HF-TRP 760. Block 723 is to determine whether UE 720 receives resource configuration and beam information from LF-TRP 740. If the result of determination block 723 is Yes, then UE 720 receives the resource configuration (e.g., timing and frequency information) and/or beam information (e.g., DL RX beam information) of the high frequency SS blocks having synchronization signal(s) and broadcast signal(s) from LF-TRP 740, as indicated in block 724. In block 725, UE 720 detects the high frequency SS blocks having synchronization signal(s) and broadcast signal(s) from HF-TRP 760 using the resource configuration and/or beam information. For example, UE 720 may use the timing information to detect the specific synchronization signals. UE 720 only needs to detect and receive the synchronization signal that is indicated in the resource configuration from LF-TRP 740. If the result of the determination block 723 is No, (i.e., UE 720 does not receive the resource configuration (e.g., timing and frequency information) and/or beam information (e.g., DL RX beam information) of the high frequency SS blocks having synchronization signal(s) and broadcast signal(s) from LF-TRP 740), UE 720 receives a reject signal from LF-TRP 740, as indicated in block 726. In this case, UE 720 needs to perform a full beam sweeping to detect the high frequency SS blocks having synchronization signal(s) and broadcast signal(s), as indicated in block 727. That is, UE 720 needs to receive all of the synchronization signal blocks in the synchronization signal frame from HF-TRP 760 to perform beam sweeping. After detecting the high frequency SS blocks having synchronization signal(s) and broadcast signal(s) in either block 725 or block 727, UE 720 is beam-aligned with HF-TRP 760, such that UE 720 knows which beam to use for transmitting and receiving data with HF-TRP 760. In block 728, UE 720 sends a beam-based RACH preamble (e.g., physical RACH (PRACH) preamble) to HF-TRP 760.

Figure 7C:
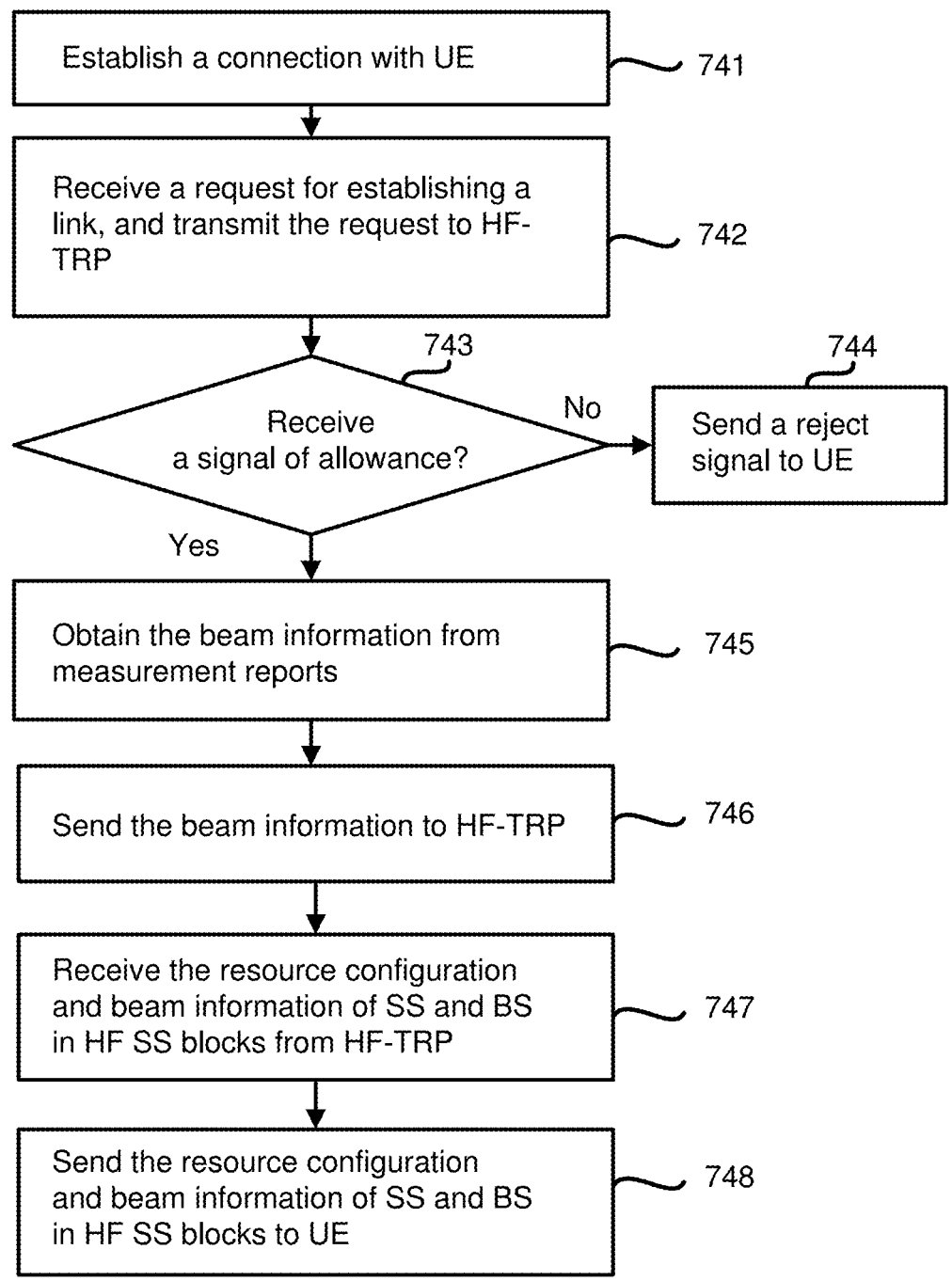
FIG. 7C is a block diagram illustrating actions taken by a LF-TRP to assist a UE to establish an initial access with a HF-TRP, according to an exemplary implementation of the present application.

FIG. 7C is a block diagram illustrating actions taken by a LF-TRP to assist a UE to establish an initial access with a HF-TRP, according to an exemplary implementation of the present application. In block 741, LF-TRP 740 establishes a connection with UE 720. In block 742, LF-TRP 740 receives a request from UE 720 for establishing a transmission link between HF-TRP 760 and UE 720. LF-TRP 740 then transmits the request to HF-TRP 760. Block 743 determines whether LF-TRP 740 receives a signal of allowance from HF-TRP 760 that allows the request of UE 720 to establish a transmission link. If the result of the determination block 743 is No (i.e., LF-TRP 740 does not receive the signal of allowance from HF-TRP 760), then LF-TRP 740 transmits a reject signal to UE 720, as indicated in block 744. If the result of the determination block 743 is Yes, then LF-TRP 740 obtains the beam information of UE 720 in low frequency, for example, by utilizing UE 720's measurement reports, as indicated in block 745. For example, LF-TRP 740 may utilize UE 720's measurement reports to obtain the beam information of UE 720 in low frequency as illustrated in FIGS. 5A and 5B. In block 746, after obtaining the beam information of UE 720 in block 745, LF-TRP 740 sends the beam information to HF-TRP 760. Then, in block 747, LF-TRP 740 receives the resource configuration (e.g., timing and frequency information) and/or beam information (e.g., DL RX beam information) of the high frequency SS blocks having synchronization signal(s) and broadcast signal(s) from HF-TRP 760. In block 748, the LF-TRP 748 transmits the resource configuration (e.g., timing and frequency information) and/or beam information (e.g., DL RX beam information) of the high frequency SS blocks having synchronization signal(s) and broadcast signal(s) to UE 720.

Figure 7D:
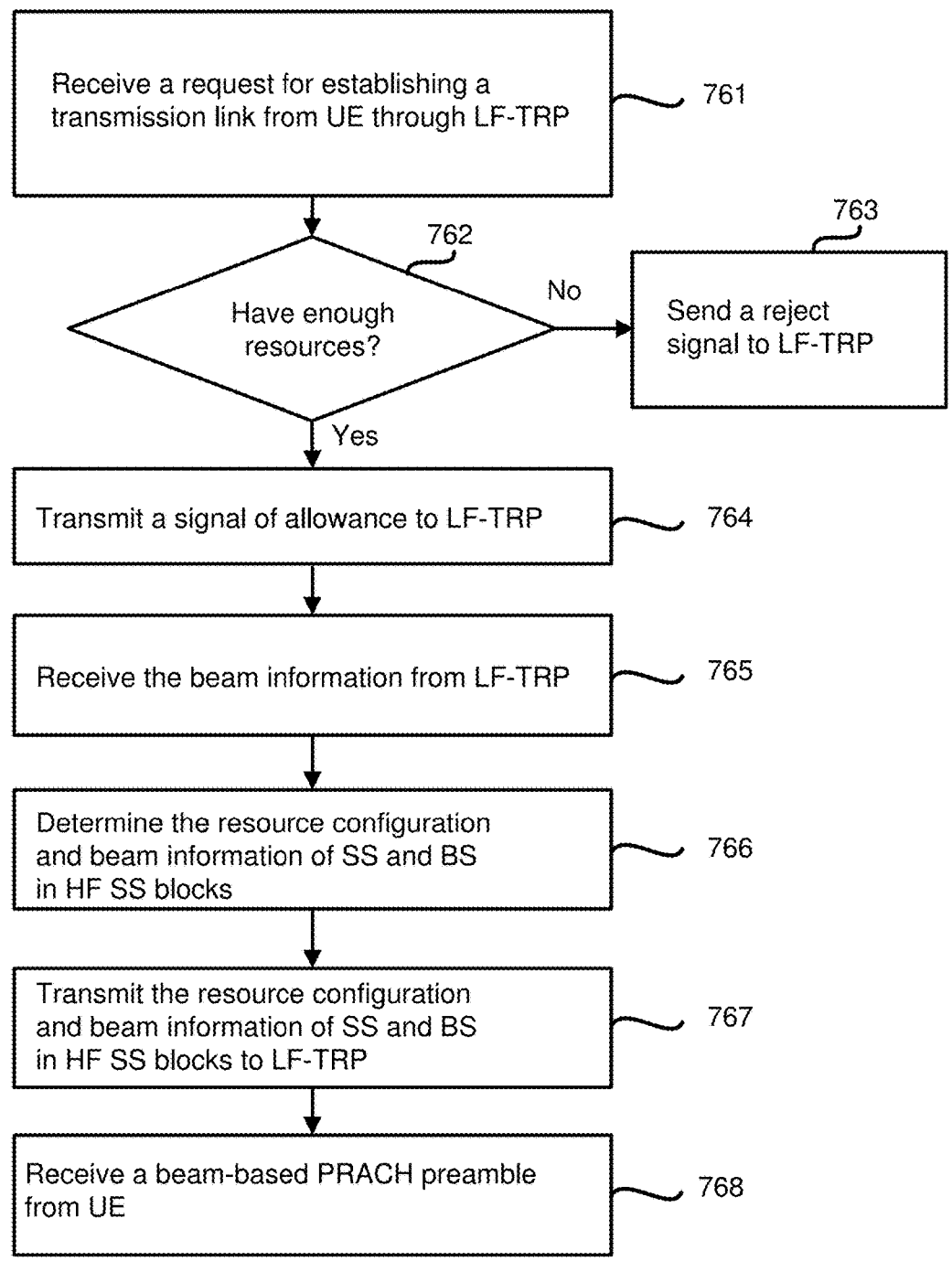
FIG. 7D is a block diagram illustrating actions taken by a HF-TRP to establish an initial access with a UE a LF-TRP, according to an exemplary implementation of the present application.

FIG. 7D is a block diagram illustrating actions taken by a HF-TRP to establish an initial access with a UE a LF-TRP, according to an exemplary implementation of the present application. In block 761, HF-TRP 760 receives a request from UE 720 through LF-TRP 740 for establishing a transmission link between UE 720 and HF-TRP 760. In block 762, HF-TRP 760 evaluates, for example, the load state of the high frequency network to determine whether there are enough radio resources for serving UE 720. If the result of the determination block 762 is No, then HF-TRP 760 sends a reject signal to LF-TRP 740, as indicated in block 763. If the result of the determination block 762 is Yes, then HF-TRP 760 sends a signal of allowance to LF-TRP 740 to allow UE 720's request, as indicated in block 764. After transmitting the signal of allowance to LF-TRP 740, HF-TRP 760 receives the beam information of UE 720 in the low frequency network from LF-TRP 740, as indicated in block 765. In block 766, HF-TRP 760 utilizes the low frequency beam information to obtain the high frequency beam information by using relative direction or beam precoding matrix index as shown in FIGS. 5A and 5B. In block 766, after obtaining the high frequency beam information, HF-TRP 760 determines the resource configuration (e.g., timing and frequency information) of the corresponding high frequency synchronization and broadcast signals, similar to what's shown in FIG. 6B. In block 767, HF-TRP 760 transmits the resource configuration (e.g., timing and frequency information) and/or beam information (e.g., DL RX beam information) of the high frequency SS blocks having synchronization signal(s) and broadcast signal(s) to LF-TRP 740, which forwards the information to UE 720 to assist UE 720 to reduce UE 720's beam sweeping time. In block 768, HF-TRP 760 receives the beam-based RACH preamble from UE 720 after beam-alignment between HF-TRP 760 and UE 720.

Case 2

HF-TRP Beam Recovery Using LF-TRP Assisted UE Beam Sweeping

Figure 2A:
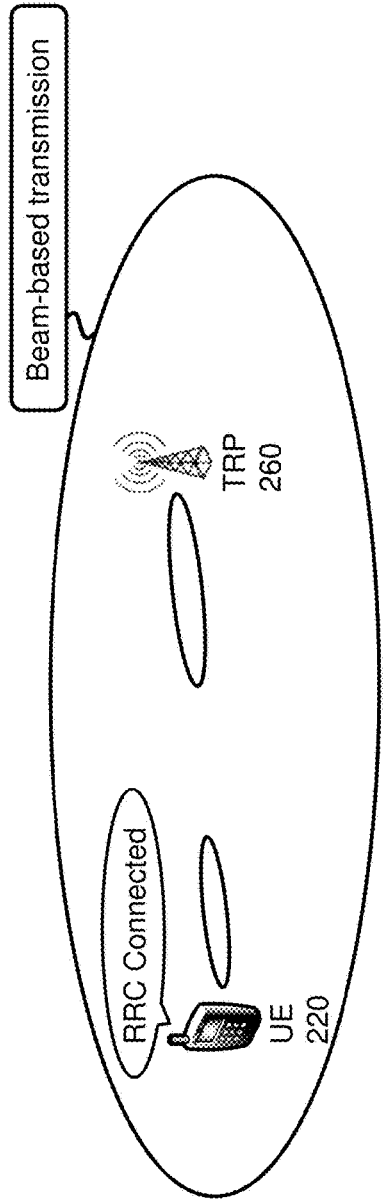
FIG. 2A is a diagram illustrating a normal beam-based transmission between a UE and a TRP in an RRC Connected state, according to an exemplary implementation of the present application.
Figure 2B:
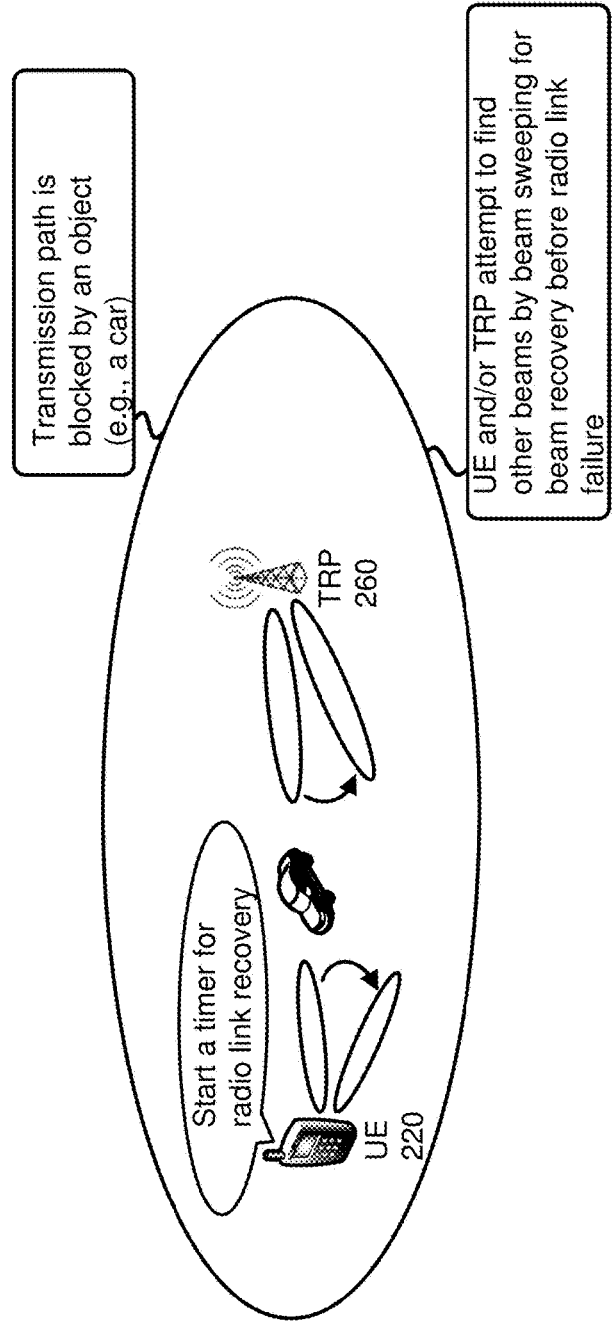
FIG. 2B is a diagram illustrating a radio link failure when a blockage occurs in the transmission path between a UE and a TRP in an RRC Connected state, according to an exemplary implementation of the present application.
Figure 8A:
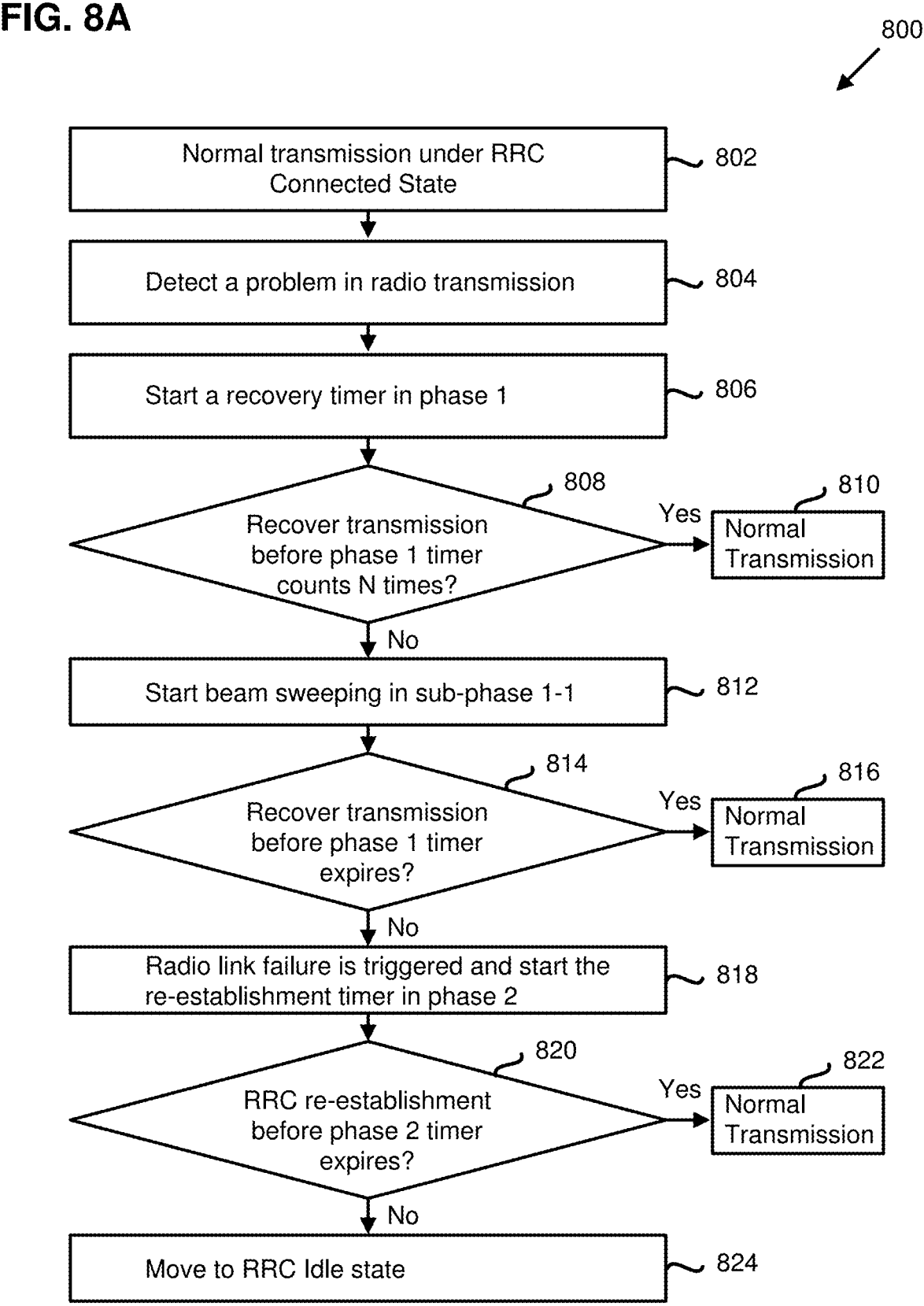
FIG. 8A is a block diagram illustrating procedures for handling radio link failure, according to an exemplary implementation of the present application.
Figure 8B:
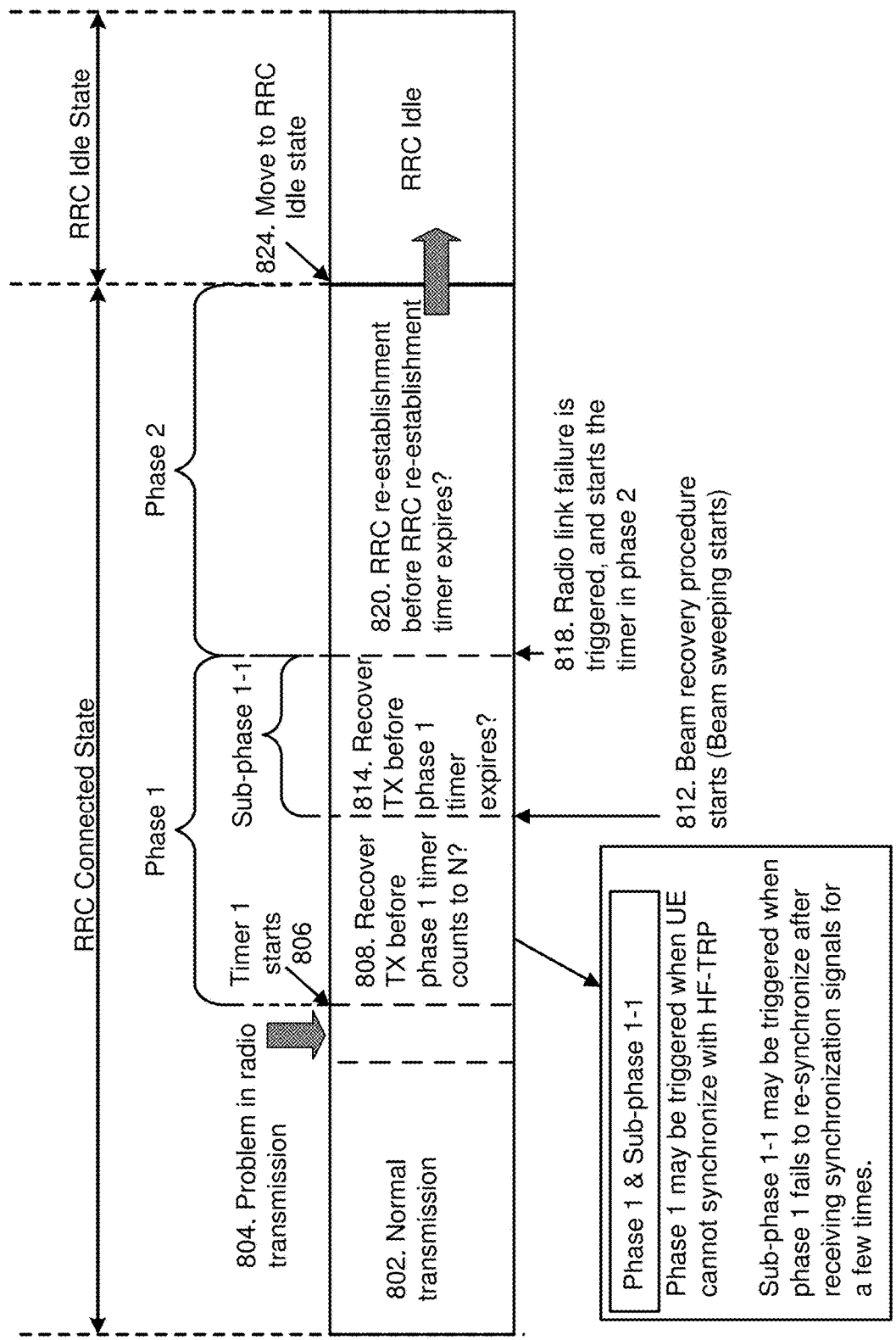
FIG. 8B is a timing diagram illustrating procedures for handling radio link failure, according to an exemplary implementation of the present application.

As discussed above with reference to FIG. 2B, radio link failure in beam-based transmission can be prevented by changing to other beams between a UE and a HF-TRP before the radio link failure timer expires. FIG. 8A is a block diagram illustrating procedures for handling radio link failure, according to an exemplary implementation of the present application. FIG. 8B is a timing diagram illustrating procedures for handling radio link failure, according to an exemplary implementation of the present application.

As illustrated in FIGS. 8A and 8B, in block 802, a UE is in RRC Connected state. The UE and HF-TRP are in a normal transmission mode. In block 804, a problem in radio transmission is detected by either the UE or the HF-TRP.

Thereafter, a phase 1 recovery timer starts in block 806. Block 808 determines whether transmission is recovered before the phase 1 recovery timer counts to N times. If the result of the determination block 808 is Yes, then the UE resumes normal transmission with the HF-TRP as indicated in block 810. If the result of the determination block 808 is No, then the UE starts beam sweeping in a sub-phase 1-1 as indicated in block 812. For example, the sub-phase 1-1 may be triggered after the UE fails to re-synchronize with the HF-TRP after receiving synchronization signal for a few times. In one exemplary implementation, when the UE fails to receive synchronization signal more than 3 times, the sub-phase 1-1 is triggered. In another exemplary implementation, when the UE fails to receive synchronization signal before the phase 1 recovery timer counts to N times, the sub-phase 1-1 is triggered. When the sub-phase 1-1 is triggered, a beam recovery procedure starts in block 812. That is, in block 812, the UE and/or HF-TRP may start beam sweeping to find other beams for recovering the transmission link before a timer in phase 1-1 and/or the phase 1 recovery timer expire. Block 814 determines whether transmission is recovered before the phase 1 recovery timer expires. If the result of the determination block 814 is Yes, then the UE resumes normal transmission with the HF-TRP, as indicated in block 816. If the result of the determination block 814 is No, then radio link failure is triggered, and a phase 2 re-establishment timer starts, as indicated in block 818. If radio link failure is triggered, the UE needs to spend more resources to obtain RACH resource for RRC re-establishment. Block 820 determines whether RRC re-establishment is accomplished before the phase 2 re-establishment timer expires. If the result of the determination block 820 is Yes, then the UE resumes normal transmission with the HF-TRP, as indicated in block 822. If the result of the determination block 820 is No, then the UE moves to RRC Idle state, as indicated in block 824. Finding other beams to recover transmission may consume many resources of the UE as a full beam sweeping takes too much time and power.

Thus, under Case 2, two methods are described below to shorten the UE's beam sweeping time by using LF-TRP assisted UE beam sweeping. FIGS. 9A, 9B, 9C, and 9D are diagrams illustrating procedures for HF-TRP beam recovery using LF-TRP assisted UE beam sweeping, according to an exemplary method of the present application. FIGS. 10A, 10B, 10C, and 10D are diagrams illustrating procedures for HF-TRP beam recovery using LF-TRP assisted UE beam sweeping, according to another exemplary method of the present application.

Figure 9A:
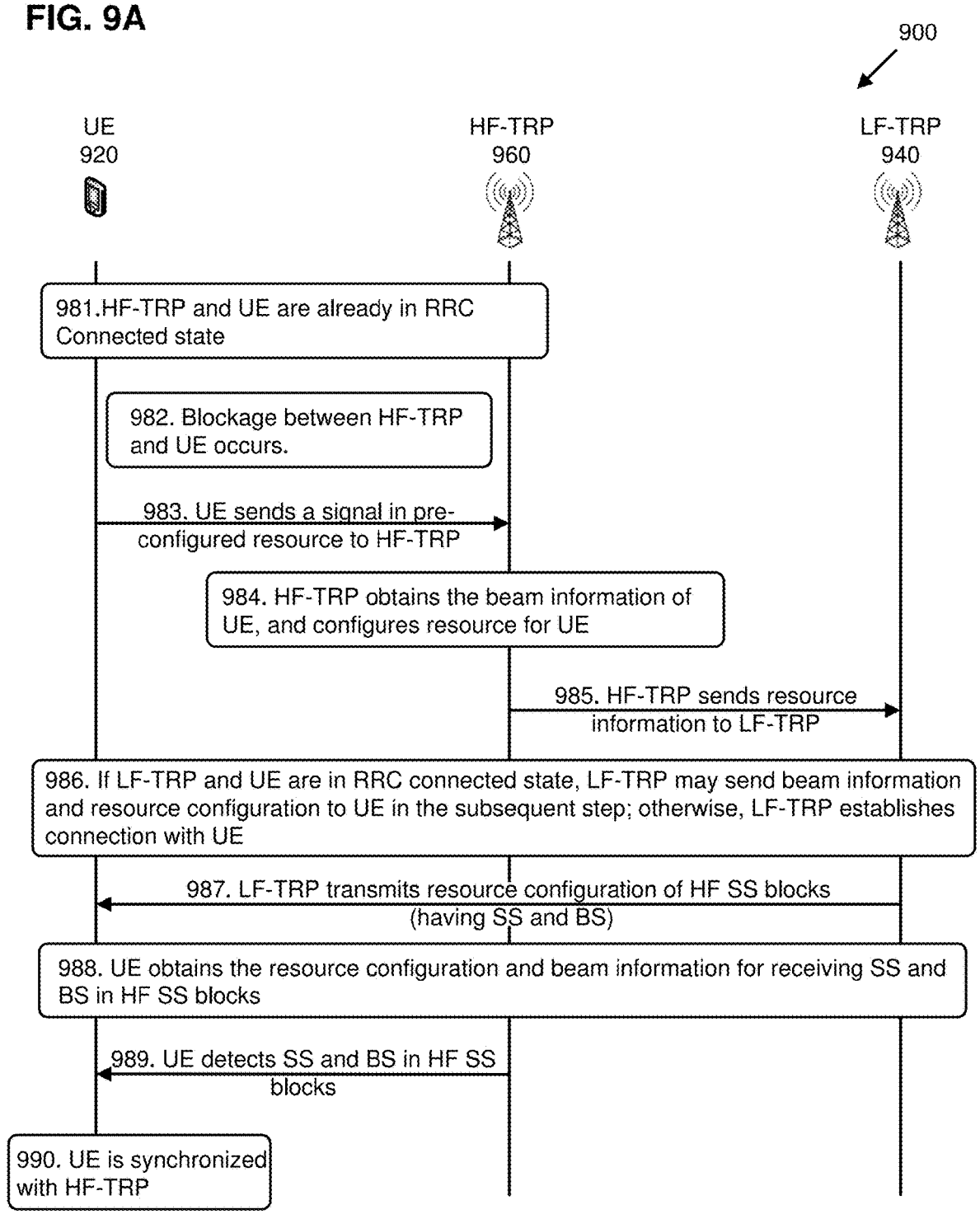
FIG. 9A is a diagram illustrating procedures for HF-TRP beam recovery using LF-TRP assisted UE beam sweeping, according to an exemplary implementation of the present application.

FIG. 9A is a diagram illustrating procedures for HF-TRP beam recovery using LF-TRP assisted UE beam sweeping, according to an exemplary implementation of the present application. In diagram 900, an NR network includes UE 920, LF-TRP 940, and HF-TRP 960. Since the NR network has both LF-TRP 940 and HF-TRP 960, the UE 920 may re-synchronize (e.g., resume normal transmission) with HF-TRP 960 with the assistance of LF-TRP 940.

In action 981, UE 920 camps on HF-TRP 960, and is already in RRC Connected state. In action 982, a blockage occurs between UE 920 and HF-TRP 960 causing an interruption in radio transmission. For example, phase 1 is triggered, when the RSRP falls below a pre-determined threshold for a period of time due to the blockage (e.g., a car, a pedestrian, and etc.) between UE 920 and HF-TRP 960. In action 983, UE 920 sends HF-TRP 960 a signal in a pre-configured resource (e.g., RACH resource). In action 984, HF-TRP 960 obtains the beam information (e.g., PMI, RI, CQI, large-scale parameters, and etc.) of UE 920, and configures resource for UE 920 based on the pre-configured resource received in action 983. In action 985, HF-TRP 960 notifies the beam information and resource configuration to LF-TRP 940. In action 986, if LF-TRP 940 and UE 920 are in RRC Connected state, LF-TRP 940 may send the beam information and resource configuration to UE 920 in the subsequent action. Otherwise, UE 920 performs initial access and random access procedures to connect with LF-TRP 940. In action 987, LF-TRP 940 transmits the resource configuration (e.g., timing and frequency information) and/or beam information (e.g., DL RX beam information) of the high frequency SS blocks having synchronization signal(s) and broadcast signal(s) to UE 920. In action 988, UE 920 obtains the resource configuration (e.g., timing and frequency information) and/or beam information (e.g., DL RX beam information) of the high frequency SS blocks having synchronization signal(s) and broadcast signal(s) and broadcast signals. In action 989, UE 920 detects the high frequency SS blocks having synchronization signal(s) and broadcast signal(s) from HF-TRP 960 in the specific resource and beam without waiting for receiving all of the SS blocks to perform beam sweeping. In action 990, UE 920 is synchronized with HF-TRP 960 using another beam, thus stopping the sub-phase 1-1 timer and preventing radio link failure. The exemplary implementation described in diagram 900 may use the structure of synchronization signal blocks as shown in FIG. 4 to improve performance. For example, HF-TRP 960 may assign coarse beam synchronization signal blocks for UE 920 with high mobility or low CQI and vice versa.

In diagram 900, UE 920 sends a beamforming signal in pre-configured resource, which can use coarse beam that covers original beam direction. If HF-TRP 960 can detect this signal while performing RX beam sweeping, HF-TRP 960 knows that this beam can be used to perform beam recovery. Thus, HF-TRP 960 notifies the beam decision to LF-TRP 940, which forwards the information to UE 920. In the present implementation, HF-TRP 960 recommends UE 920 the beam information with the assistance of LF-TRP 940.

Figure 9B:
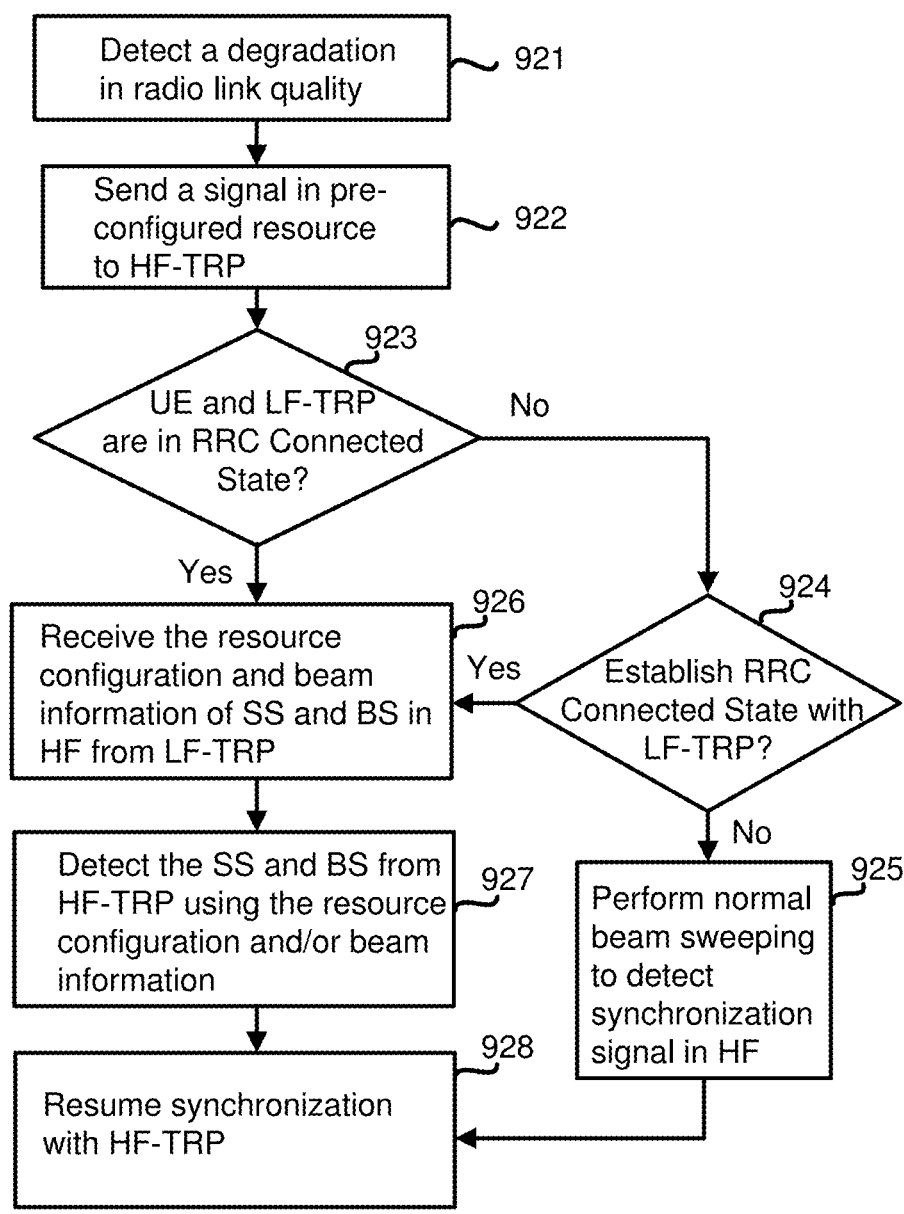
FIG. 9B is a block diagram illustrating actions taken by a UE for HF-TRP beam recovery using LF-TRP assisted UE beam sweeping, according to an exemplary implementation of the present application.

FIG. 9B is a block diagram illustrating actions taken by a UE for HF-TRP beam recovery using LF-TRP assisted UE beam sweeping, according to an exemplary implementation of the present application. In block 921, UE 920 detects a degradation in radio link quality. In block 922, UE 920 sends a signal in pre-configured resource to HF-TRP 960 for beam recovery. Block 923 is to determine whether UE 920 and LF-TRP 940 are in RRC Connected state. If the result of the determination block 923 is No, then UE 920 attempts to establish RRC Connected state with LF-TRP 940, as indicated in block 924. If the result of the determination block 924 is Yes (i.e., the UE 920 is able to transition to RRC Connected state to establish communication with LF-TRP 940), then UE 920 proceeds to block 926 to receive resource configuration (e.g., timing and frequency information) and/or beam information (e.g., DL RX beam information) of the high frequency SS blocks having synchronization signal(s) and broadcast signal(s) from LF-TRP 940. If the result of the determination block 924 is No, then UE 920 proceeds to block 925 to perform normal beam sweeping to detect synchronization signal in high frequency. If the result of the determination block 923 is Yes, then UE 920 receives the resource configuration (e.g., timing and frequency information) and/or beam information (e.g., DL RX beam information) of the high frequency SS blocks having synchronization signal(s) and broadcast signal(s) from LF-TRP 940, as indicated in block 926. In block 927, UE 920 detects the high frequency SS blocks having synchronization signal(s) and broadcast signal(s) from HF-TRP 960 in the specific resource and beam without waiting for receiving all of the SS blocks to perform beam sweeping. In block 928, UE 920 resumes synchronization with HF-TRP 960.

Figure 9C:
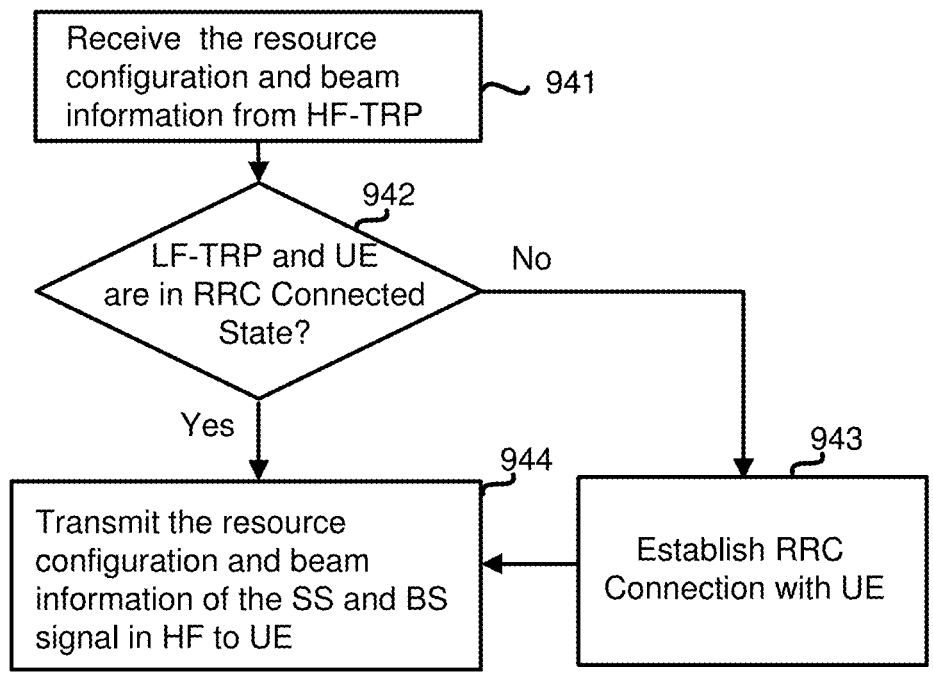
FIG. 9C is a block diagram illustrating actions taken by a LF-TRP for HF-TRP beam recovery using LF-TRP assisted UE beam sweeping, according to an exemplary implementation of the present application.

FIG. 9C is a block diagram illustrating actions taken by a LF-TRP for HF-TRP beam recovery using LF-TRP assisted UE beam sweeping, according to an exemplary implementation of the present application. In block 941, LF-TRP 940 receives the resource configuration (e.g., timing and frequency information) and/or beam information (e.g., DL RX beam information) of the high frequency SS blocks having synchronization signal(s) and broadcast signal(s) from HF-TRP 960. Block 942 is to determine whether LF-TRP 940 and UE 920 are in RRC Connected state. If the result of the determination block 942 is No, then LF-TRP 940 attempts to establish an RRC connection with UE 920, as indicated in block 943. If the result of the determination block 942 is Yes, then LF-TRP 940 transmits the resource configuration (e.g., timing and frequency information) and/or beam information (e.g., DL RX beam information) of the high frequency SS blocks having synchronization signal(s) and broadcast signal(s) to UE 920, as indicated in block 944.

Figure 9D:
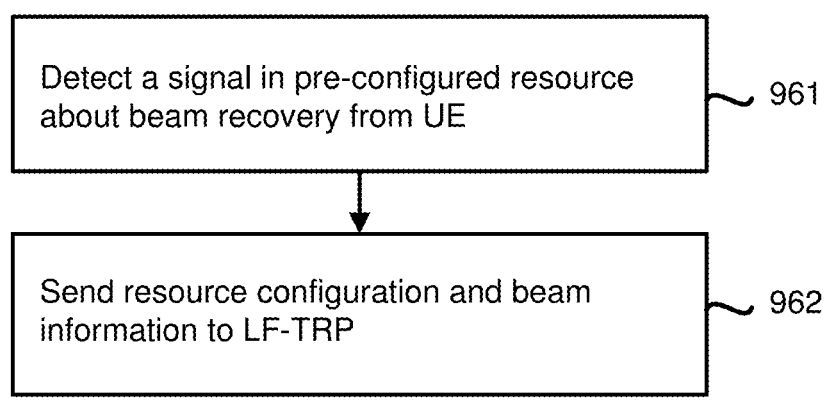
FIG. 9D is a block diagram illustrating actions taken by a HF-TRP for HF-TRP beam recovery using LF-TRP assisted UE beam sweeping, according to an exemplary implementation of the present application.

FIG. 9D is a block diagram illustrating actions taken by a HF-TRP for HF-TRP beam recovery using LF-TRP assisted UE beam sweeping, according to an exemplary implementation of the present application. In block 961, HF-TRP 960 receives a signal in pre-configured resource from UE 920 for beam recovery. In block 962, HF-TRP 960 transmits resource configuration (e.g., timing and frequency information) and/or beam information (e.g., DL RX beam information) of the high frequency SS blocks having synchronization signal(s) and broadcast signal(s) to LF-TRP 940.

Figure 10B:
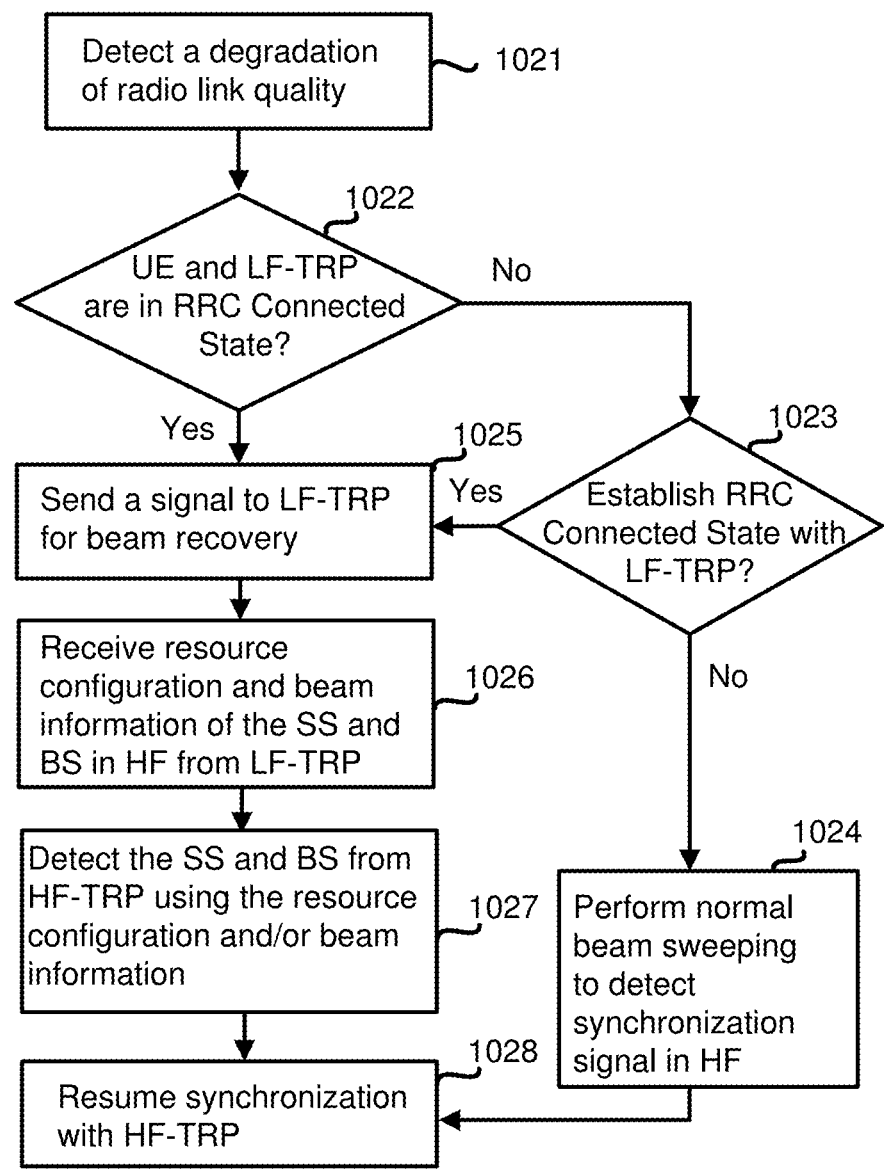
FIG. 10B is a block diagram illustrating actions taken by a UE for HF-TRP beam recovery using LF-TRP assisted UE beam sweeping, according to an exemplary implementation of the present application.

FIGS. 10A, 10B, 10C, and 10D are diagrams illustrating procedures for HF-TRP beam recovery using LF-TRP assisted UE beam sweeping, according to another exemplary method of the present application. FIG. 10A is a diagram illustrating procedures for HF-TRP beam recovery using LF-TRP assisted UE beam sweeping, according to an exemplary implementation of the present application. In diagram 1000, an NR network includes UE 1020, LF-TRP 1040, and HF-TRP 1060. Since the NR network has both LF-TRP 1040 and HF-TRP 1060, the UE 1020 may re-synchronize (e.g., resume normal transmission) with HF-TRP 1060 with the assistance of LF-TRP 1040.

In action 1081, UE 1020 camps on HF-TRP 1060, and is already in RRC Connected state. In action 1082, a blockage occurs between UE 1020 and HF-TRP 1060 causing an interruption in radio transmission. For example, phase 1 is triggered, when the RSRP falls below a pre-determined threshold for a period of time due to the blockage (e.g., a car, a pedestrian, and etc.) between UE 1020 and HF-TRP 1060. In action 1083, if LF-TRP 1040 and UE 1020 are in RRC Connected state, UE 1020 may send the beam information and resource configuration to LF-TRP 1040 in a subsequent action. Otherwise, UE 1020 performs initial access and random access procedures to connect with LF-TRP 1040. In action 1084, UE 1020 sends LF-TRP 1040 an indication to LF-TRP 1040 requesting assistance from LF-TRP 1040 for HF-TRP beam recovery procedure. In action 1085, LF-TRP 1040 notifies HF-TRP 1060 that UE 1020 needs beam recovery. In action 1086, after receiving the notification from LF-TRP 1040, HF-TRP 1060 selects another beam in the same beam group for downlink based upon previous UE's measurement reports, and sends the beam information and SFNs in which UE 1020 is likely to detect the synchronization and broadcast signals. In action 1087, HF-TRP 1060 transmits the resource configuration (e.g., timing and frequency information) and/or beam information (e.g., DL RX beam information) of the high frequency synchronization signals and broadcast signals to LF-TRP 1040. In action 1088, LF-TRP 1040 transmits the resource configuration (e.g., timing and frequency information) and/or beam information (e.g., DL RX beam information) of the high frequency SS blocks having synchronization signal(s) and broadcast signal(s) to UE 1020. In action 1089, UE 1020 obtains the resource configuration (e.g., timing and frequency information) and/or beam information (e.g., DL RX beam information) of the high frequency synchronization signals and broadcast signals from LF-TRP 1040. In action 1090, UE 1020 detects the high frequency SS blocks having synchronization signal(s) and broadcast signal(s) from HF-TRP 1060 in the specific resource and beam without waiting for receiving all of the synchronization signal blocks to perform beam sweeping. In action 1091, UE 1020 is synchronized with HF-TRP 1060 using another beam, thus stopping the sub-phase 1-1 timer and preventing radio link failure.

In the present exemplary method, UE 1020 sends an indication to LF-TRP 1040 when sub-phase 1-1 timer starts. LF-TRP 1040 then notifies HF-TRP 1060 that UE 1020 needs to perform beam recovery procedure. Then, HF-TRP 1060 decides which beam for recovery based upon previous UE's measurement reports, and asks LF-TRP 1040 to notify UE 1020 with resource configuration.

FIG. 10B is a block diagram illustrating actions taken by a UE for HF-TRP beam recovery using LF-TRP assisted UE beam sweeping, according to an exemplary implementation of the present application. In block 1021, UE 1020 detects a degradation in radio link quality. Block 1022 is to determine whether UE 1020 and LF-TRP 1040 are in RRC Connected state. If the result of the determination block 1022 is No, then UE 1020 attempts to establish RRC Connected state with LF-TRP 1040, as indicated in block 1023. If the result of the determination block 1022 is Yes (i.e., the UE 1020 is able to transition to RRC Connected state to establish communication with LF-TRP 1040), then UE 1020 proceeds to block 1025 to send a signal to LF-TRP 1040 for beam recovery. If the result of the determination block 1023 is No, then UE 1020 proceeds to block 1024 to perform normal beam sweeping to detect synchronization signal in high frequency. In block 1026, UE 1020 receives the resource configuration (e.g., timing and frequency information) and/or beam information (e.g., DL RX beam information) of the high frequency SS blocks having synchronization signal(s) and broadcast signal(s) from LF-TRP 1040. In block 1027, UE 1020 detects the high frequency SS blocks having synchronization signal(s) and broadcast signal(s) from HF-TRP 1060 in the specific resource and beam without waiting for receiving all of the synchronization signal blocks to perform beam sweeping. In block 1028, UE 1020 resumes synchronization with HF-TRP 1060.

Figure 10C:
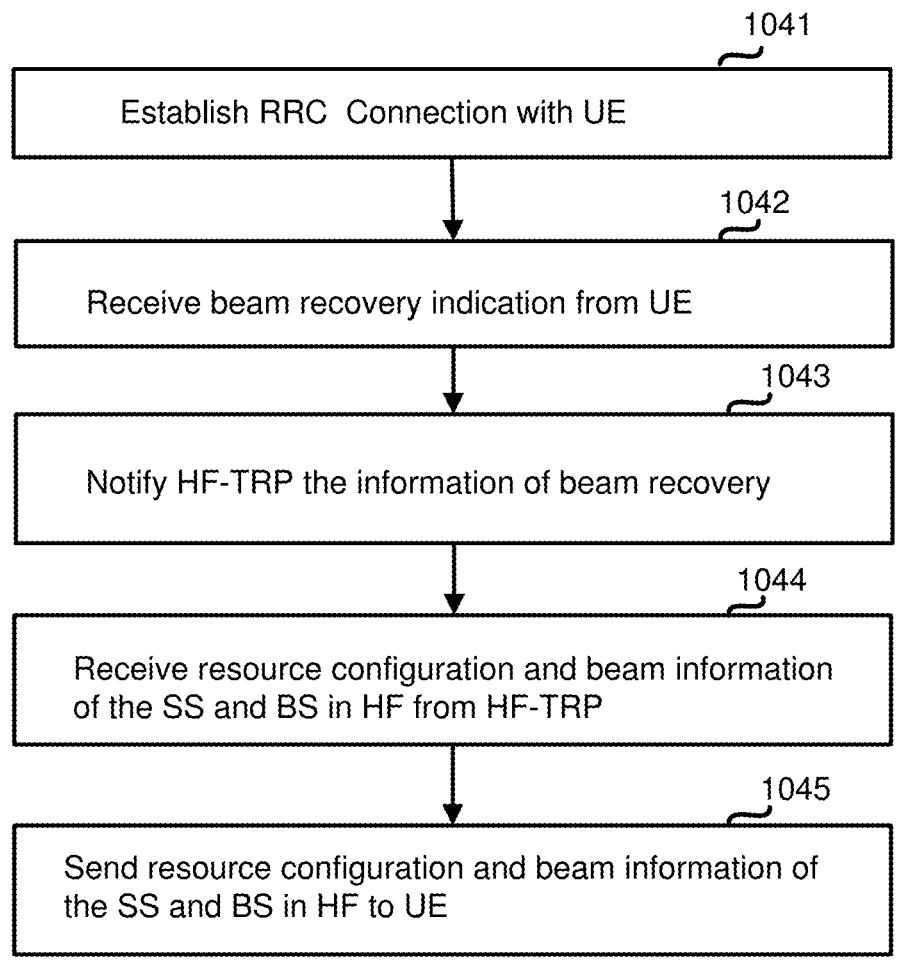
FIG. 10C is a block diagram illustrating actions taken by a LF-TRP for HF-TRP beam recovery using LF-TRP assisted UE beam sweeping, according to an exemplary implementation of the present application.

FIG. 10C is a block diagram illustrating actions taken by a LF-TRP for HF-TRP beam recovery using LF-TRP assisted UE beam sweeping, according to an exemplary implementation of the present application. In block 1041, LF-TRP 1040 attempts to establish an RRC connection with UE 1020. In block 1042, upon stablishing an RRC connection with UE 1020, LF-TRP 1040 receives a signal from UE 102 for beam recovery. In block 1043, LF-TRP 1040 transmits the signal from UE 102 for beam recovery to HF-TRP 1060. In block 1044, LF-TRP 1040 receives resource configuration (e.g., timing and frequency information) and/or beam information (e.g., DL RX beam information) of the high frequency SS blocks having synchronization signal(s) and broadcast signal(s) from HF-TRP 1060. In block 1045, LF-TRP 1040 transmits the resource configuration (e.g., timing and frequency information) and/or beam information (e.g., DL RX beam information) of the high frequency SS blocks having synchronization signal(s) and broadcast signal(s) to UE 1020.

Figure 10D:
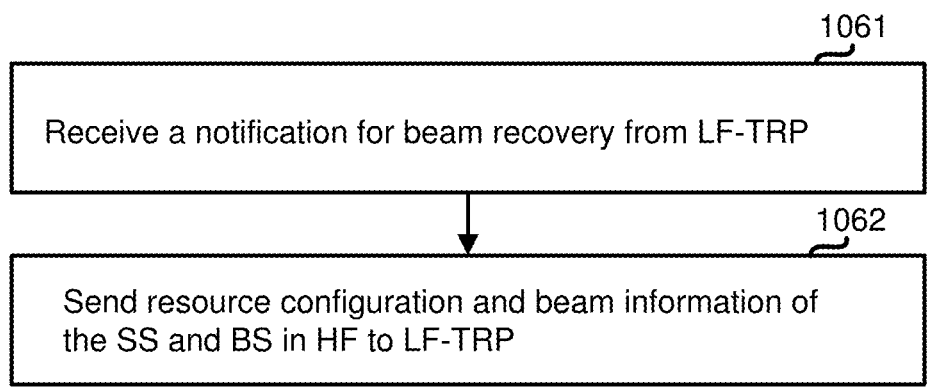
FIG. 10D is a block diagram illustrating actions taken by a HF-TRP for HF-TRP beam recovery using LF-TRP assisted UE beam sweeping, according to an exemplary implementation of the present application.

FIG. 10D is a block diagram illustrating actions taken by a HF-TRP for HF-TRP beam recovery using LF-TRP assisted UE beam sweeping, according to an exemplary implementation of the present application. In block 1061, HF-TRP 1060 receives a signal from LF-TRP 1040 for beam recovery. In block 1062, HF-TRP 1060 transmits resource configuration (e.g., timing and frequency information) and/or beam information (e.g., DL RX beam information) of the high frequency SS blocks having synchronization signal(s) and broadcast signal(s) to LF-TRP 1040.

It is noted that in the exemplary implementation illustrated in diagram 1000 in FIG. 10A, UE 1020 does not need to send beam forming signal to HF-TRP, thus substantially saving power for UE 1020. The exemplary implementation described in diagram 1000 may use the structure of synchronization signal blocks as shown in FIG. 4 to improve performance. For example, HF-TRP 1060 may assign coarse beam synchronization signal blocks for UE 1020 with high mobility or low CQI and vice versa.

Figure 11:
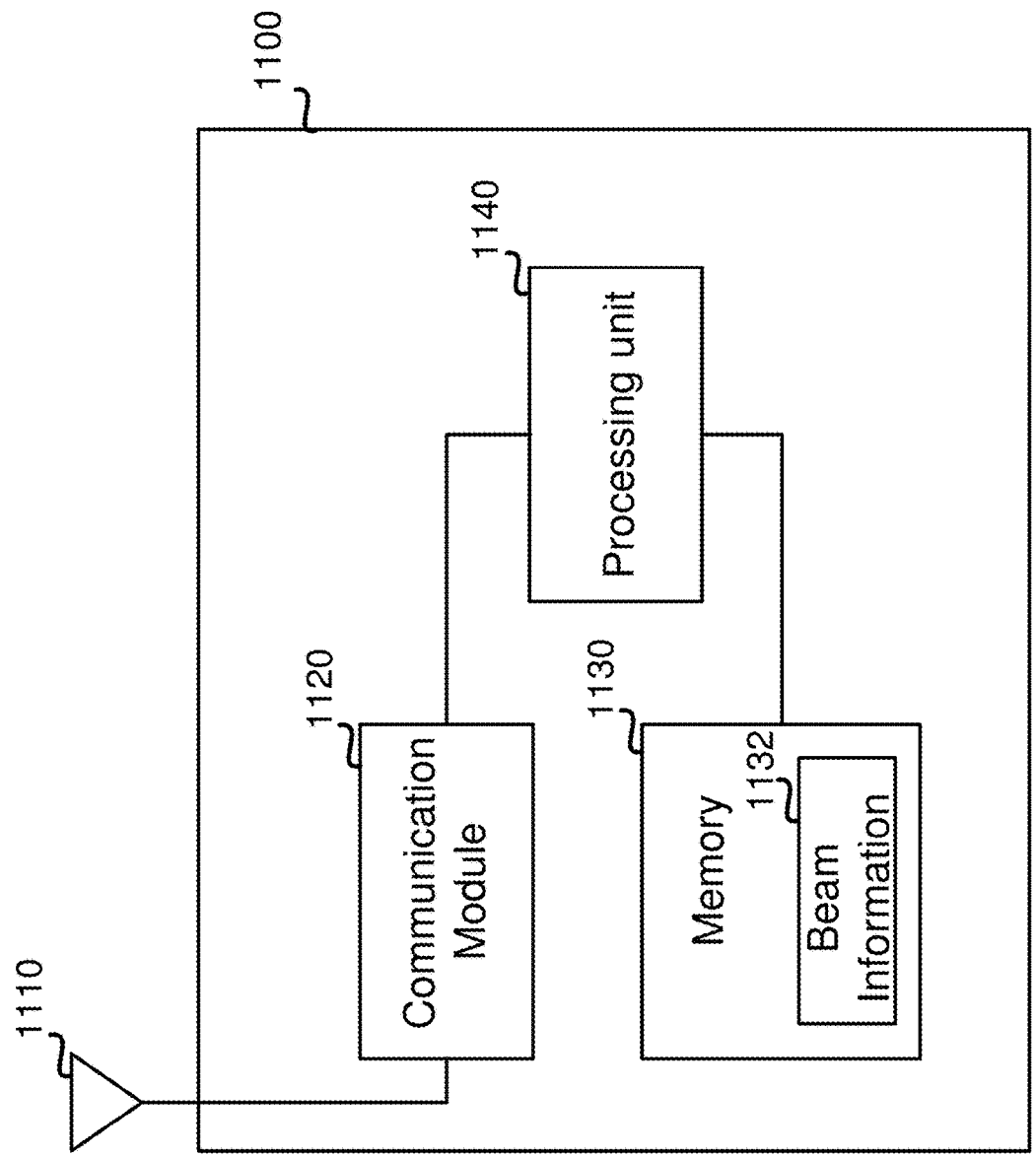
FIG. 11 is a block diagram illustrating a radio communication equipment for a cell, in accordance with an exemplary implementation of the present application.

FIG. 11 is a block diagram illustrating a radio communication equipment for a cell, in accordance with an exemplary implementation of the present application. The radio communication equipment may be configured to implement the LF-TRP assisted beam sweeping methods for beam alignment between the radio communication equipment and a HF-TRP for initial access and beam recovery procedures described with reference to FIGS. 1 through 10D above. In FIG. 11, radio communication equipment 1100 includes antenna module 1110, communication module 1120, memory 1130, and processing unit 1140. Antenna module 1110 is coupled to communication module 1120. Communication module 1120 and memory 1130 are configured to couple to processing unit 1140. In one implementation, radio communication equipment 1100 may be a UE described with reference to FIGS. 1 through 10D above.

Antenna module 1110 may comprise one or more antennas, and may be configured to perform beam sweeping of one or more SS blocks with in a SS frame from the HF-TRP. Communication module 1120 may comprise one or more transmitters and one or more receivers for allowing the radio communication equipment to perform beam alignment between the radio communication equipment and the HF-TRP for initial access and beam recovery procedures using antenna module 1110.

Processing unit 1140 is configured to control the operation of the radio communication equipment and function as the central processing core for the radio communication equipment. Memory 1130 is configured to store program instructions for the execution by processing unit 1140. Memory 1130 is further configured to allocate a memory space for storing beam information 1132 and other information (e.g., PHY configurations). The program instructions stored upon execution by processing unit 1140, causes the processing unit 1140 to implement one or more the aforementioned methods for the LF-TRP assisted beam alignment between the radio communication equipment and the HF-TRP for initial access and beam recovery procedures.

Additionally, radio communication equipment 1100 may further include other necessary network elements for supporting the network operations of the radio communication equipment may not be essential to the present application. The details of such elements are hereby omitted for brevity.

What is claimed is:

1. A method for measuring a first cell in a user equipment (UE), the method comprising:
   receiving a configuration message from a second cell, wherein the configuration message comprises:
     timing information including a synchronization signal periodicity and a timing offset of a synchronization signal block (SSB) within a synchronization signal period on the first cell, the timing offset of the SSB associated with a physical random access channel (PRACH) resource; and
     assistance information associated with a system frame number (SFN) of the first cell, the SFN applied by the UE in the first cell for detecting a synchronization signal in the SSB;
   detecting the synchronization signal in the SSB on the first cell based on the timing information and assistance information;
   measuring the detected synchronization signal and obtaining a measurement result, the measurement result indicating a signal quality of the detected synchronization signal; and
   transmitting, based on the measurement result, a random access preamble on the PRACH resource associated with the detected synchronization signal,
   wherein:
     the first cell operates in a first frequency;
     the second cell operates in a second frequency; and
     the first frequency is different from the second frequency.

2. The method of claim 1, further comprising:
   receiving beam information of the SSB on the first cell from the second cell;
   wherein detecting the synchronization signal in the SSB comprises detecting the synchronization signal in the SSB based on the timing information, assistance information, and beam information.

3. The method of claim 2, wherein the beam information is transmitted using radio resource control (RRC) signaling.

4. The method of claim 2, wherein the beam information comprises at least one of:
   information related to a transmission beam transmitted from the first cell; and
   information related to a reception beam for the UE to receive the transmission beam transmitted from the first cell.

5. The method of claim 1, wherein:
   the first cell at least transmits or receives using a first bandwidth part of a frequency band; and
   the second cell at least transmits or receives using a second bandwidth part of the frequency band,
   wherein the first frequency is within the first bandwidth part, and the second frequency is within the second bandwidth part.

6. The method of claim 1, wherein:
   the first cell at least transmits or receives using a first frequency band;
   the second cell at least transmits or receives using a second frequency band,
   wherein the first frequency is within the first frequency band and the second frequency is within the second frequency band.

7. The method of claim 1, further comprising:
transmitting, by the UE, a connection request to the second cell for connection with the first cell;
transmitting, by the second cell, UE information to the first cell.

8. The method of claim 2, further comprising:
determining, by the first cell, the beam information of the SSB based on UE information, wherein the UE information includes at least one of the following:
a channel state information (CSI) report of the first cell, the CSI report including at least one of channel quality information (CQI), a precoding matrix index (PMI), a rank indicator (RI), and a channel state information reference signal (CSI-RS) resource indicator; and
a radio resource management (RRM) measurement report of the first cell, the RRM measurement report including one or more indices of reference signals, the reference signals including the SSB and the CSI-RS.

9. The method of claim 1, further comprising:
transmitting a signal in a pre-configured resource to the first cell after detecting a problem in radio transmission between the UE and the first cell.

10. The method of claim 1, further comprising:
transmitting, by the UE, a signal indicating a beam recovery procedure to the first cell through the second cell after detecting a problem in radio transmission between the UE and the first cell.

11. The method of claim 10, wherein the first cell selects another beam for the UE based on a previous UE measurement report.

12. A user equipment (UE) for wireless communication, the UE comprising:
one or more non-transitory computer-readable media having computer-executable instructions embodied thereon;
at least one processor coupled to the one or more non-transitory computer-readable media, and configured to execute the computer-executable instructions to cause the UE to:
receive a configuration message from a second cell, wherein the configuration message comprises:
timing information including a synchronization signal periodicity and a timing offset of a synchronization signal block (SSB) within a synchronization signal period on the first cell, the timing offset of the SSB associated with a physical random access channel (PRACH) resource; and
assistance information associated with a system frame number (SFN) of the first cell, the SFN applied by the UE in the first cell for detecting a synchronization signal in the SSB;
detect the synchronization signal in the SSB on the first cell based on the timing information and assistance information;
measure the detected synchronization signal and obtain a measurement result, the measurement result indicating a signal quality of the detected synchronization signal; and
transmit, based on the measurement result, a random access preamble on the PRACH resource associated with the detected synchronization signal,
wherein:
the first cell operates in a first frequency;
the second cell operates in a second frequency; and
the first frequency is different from the second frequency.

13. The UE of claim 12, wherein the at least one processor is further configured to execute the computer-executable instructions to cause the UE to:
receive beam information of the SSB on the first cell from the second cell;
wherein the at least one processor is configured to execute the computer-executable instructions to cause the UE to detect the synchronization signal in the SSB based on the timing information, assistance information, and beam information.

14. The UE of claim 12, wherein the beam information is transmitted using radio resource control (RRC) signaling.

15. The UE of claim 12, wherein the beam information comprises at least one of:
information related to a transmission beam transmitted from the first cell; and
information related to a reception beam for the UE to receive the transmission beam transmitted from the first cell.

16. The UE of claim 12, wherein the at least one processor is further configured to execute the computer-executable instructions to:
transmit a connection request to the second cell for connection with the first cell,
wherein UE information is transmitted by the second cell to the first cell.

17. The UE of claim 13, wherein:
the beam information of the SSB is determined by the first cell based on UE information, wherein the UE information includes at least one of the following:
a channel state information (CSI) report of the first cell, the CSI report including at least one of channel quality information (CQI), a precoding matrix index (PMI), a rank indicator (RI), and a channel state information reference signal (CSI-RS) resource indicator; and
a radio resource management (RRM) measurement report of the first cell, the RRM measurement report including one or more indices of reference signals, the reference signals including the SSB and the CSI-RS.

18. The UE of claim 12, wherein the at least one processor is further configured to execute the computer-executable instructions to:
transmit a signal in a pre-configured resource to the first cell after detecting a problem in radio transmission between the UE and the first cell.

19. The UE of claim 12, wherein the at least one processor is further configured to execute the computer-executable instructions to:
transmit a signal indicating a beam recovery procedure to the first cell through the second cell after detecting a problem in radio transmission between the UE and the first cell.

20. The UE of claim 19, wherein the first cell selects another beam for the UE based on a previous UE's measurement report.

* * * * *